US010402363B2

United States Patent
Long et al.

(10) Patent No.: US 10,402,363 B2
(45) Date of Patent: Sep. 3, 2019

(54) MULTI-PORT INTERPOSER ARCHITECTURES IN DATA STORAGE SYSTEMS

(71) Applicant: Liqid Inc., Lafayette, CO (US)

(72) Inventors: Christopher R. Long, Colorado Springs, CO (US); Phillip Clark, Boulder, CO (US); Jason Breakstone, Broomfield, CO (US); Huiji Wang, Broomfield, CO (US); Sumit Puri, Calabasas, CA (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 15/618,668

(22) Filed: Jun. 9, 2017

(65) Prior Publication Data

US 2017/0357609 A1 Dec. 14, 2017

Related U.S. Application Data

(60) Provisional application No. 62/348,625, filed on Jun. 10, 2016.

(51) Int. Cl.
*G06F 13/42* (2006.01)
*G06F 13/16* (2006.01)

(52) U.S. Cl.
CPC .......... *G06F 13/4282* (2013.01); *G06F 13/16* (2013.01); *G06F 2213/0026* (2013.01)

(58) Field of Classification Search
CPC ............. G06F 13/4022; G06F 13/4221; G06F 2213/0026
See application file for complete search history.

(56) References Cited

U.S. PATENT DOCUMENTS

| 7,243,145 | B1 | 7/2007 | Poortman |
| 7,260,487 | B2 | 8/2007 | Brey et al. |
| 7,505,889 | B2 | 3/2009 | Salmonsen et al. |
| 7,519,761 | B2 * | 4/2009 | Gregg ................. G06F 13/4027 710/1 |
| 7,606,960 | B2 | 10/2009 | Munguia |

(Continued)

OTHER PUBLICATIONS

International Application No. PCT/US2017/036739, International Search & Written Opinion, 14 pages, dated Oct. 3, 2017.

(Continued)

*Primary Examiner* — Tim T Vo

(57) ABSTRACT

Systems, methods, apparatuses, and architectures for storage interposers are provided herein. In one example, a storage interposer module includes Peripheral Component Interconnect Express (PCIe) switch circuitry receives storage operations over a host connector that are issued by one or more host systems and transfers the storage operations for storage by one or more storage devices over drive PCIe interfaces. The storage interposer module also includes a control module configured to monitor the storage operations in the PCIe switch circuitry via a control interface coupled between the PCIe switch circuitry and the interposer control module, and selectively direct delivery of each of the storage operations to corresponding storage areas among the one or more storage devices based at least on information monitored about the storage operations in the PCIe switch circuitry.

17 Claims, 14 Drawing Sheets

(56) References Cited

U.S. PATENT DOCUMENTS

| | | | |
|---|---|---|---|
| 7,725,757 B2 | 5/2010 | Padweka et al. | |
| 8,125,919 B1 | 2/2012 | Khanka et al. | |
| 8,677,180 B2* | 3/2014 | Bayer | G06F 11/2033 |
| | | | 714/11 |
| 8,688,926 B2 | 4/2014 | Breakstone et al. | |
| 8,700,856 B2* | 4/2014 | Tanaka | H04L 49/552 |
| | | | 711/123 |
| 8,732,349 B2* | 5/2014 | Kishore | G06F 13/102 |
| | | | 710/20 |
| 9,003,090 B1* | 4/2015 | Davis | G06F 13/42 |
| | | | 710/105 |
| 9,612,989 B2* | 4/2017 | Eguchi | G06F 13/36 |
| 9,678,910 B2 | 6/2017 | Breakstone et al. | |
| 2003/0110423 A1 | 6/2003 | Helms et al. | |
| 2003/0126478 A1 | 7/2003 | Burns et al. | |
| 2004/0156151 A1 | 8/2004 | Morrow | |
| 2005/0223136 A1 | 10/2005 | Tanaka et al. | |
| 2006/0277206 A1 | 12/2006 | Bailey et al. | |
| 2008/0198744 A1 | 8/2008 | Menth | |
| 2009/0006837 A1 | 1/2009 | Rothman et al. | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2010/0088467 A1 | 4/2010 | Lee et al. | |
| 2010/0153621 A1 | 6/2010 | Kreiner et al. | |
| 2011/0299317 A1 | 12/2011 | Shaeffer et al. | |
| 2013/0007410 A1 | 1/2013 | Kopylovitz et al. | |
| 2013/0024595 A1 | 1/2013 | Subramaniyan et al. | |
| 2013/0254453 A1* | 9/2013 | Sato | G06F 13/4022 |
| | | | 710/317 |
| 2014/0068127 A1 | 3/2014 | Baron et al. | |
| 2014/0327630 A1* | 11/2014 | Burr | G06F 3/0488 |
| | | | 345/173 |
| 2015/0355686 A1 | 12/2015 | Heyd et al. | |
| 2015/0370666 A1* | 12/2015 | Breakstone | G06F 11/2012 |
| | | | 714/6.3 |
| 2015/0371684 A1* | 12/2015 | Mataya | G11C 29/44 |
| | | | 365/52 |
| 2017/0308325 A1 | 10/2017 | Pearson et al. | |
| 2017/0315873 A1 | 11/2017 | Alcorn et al. | |
| 2017/0322605 A1 | 11/2017 | Potter et al. | |
| 2018/0034374 A1 | 2/2018 | Breen et al. | |

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.

* cited by examiner

MULTI-PORT INTERPOSER ARCHITECTURES IN DATA STORAGE SYSTEMS

RELATED APPLICATIONS

This application hereby claims the benefit of and priority to U.S. Provisional Patent Application 62/348,625, titled "STORAGE INTERPOSER ARCHITECTURES FOR PCIe STORAGE SYSTEMS," filed Jun. 10, 2016, which is hereby incorporated by reference in its entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

Overview

Systems, methods, apparatuses, and architectures for storage interposers are provided herein. In one example, a storage interposer module includes Peripheral Component Interconnect Express (PCIe) switch circuitry receives storage operations over a host connector that are issued by one or more host systems and transfers the storage operations for storage by one or more storage devices over drive PCIe interfaces. The storage interposer module also includes a control module configured to monitor the storage operations in the PCIe switch circuitry via a control interface coupled between the PCIe switch circuitry and the interposer control module, and selectively direct delivery of each of the storage operations to corresponding storage areas among the one or more storage devices based at least on information monitored about the storage operations in the PCIe switch circuitry.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Described herein are various enhanced storage handling elements, referred to as interposers or interposer modules. Functionality of these interposers or interposer modules can be integrated into storage devices, such as storage add-in cards or discrete storage drives, or can instead be coupled between existing hosts and discrete storage drives to provide enhanced features without altering the storage drives and hardware of the hosts. The architectural arrangements herein provide for enhanced storage device operation. For example, dual-port functionality can be added to single-port storage devices and hosts, and multiple storage drives can be handled over a single host interface. Additional data enhancement features can be provided, such as compression, deduplication, namespace abstractions, host-to-host communications, shared storage spaces, resource locking for storage space exclusivity, and data redundancy features, among others.

Figure 1:
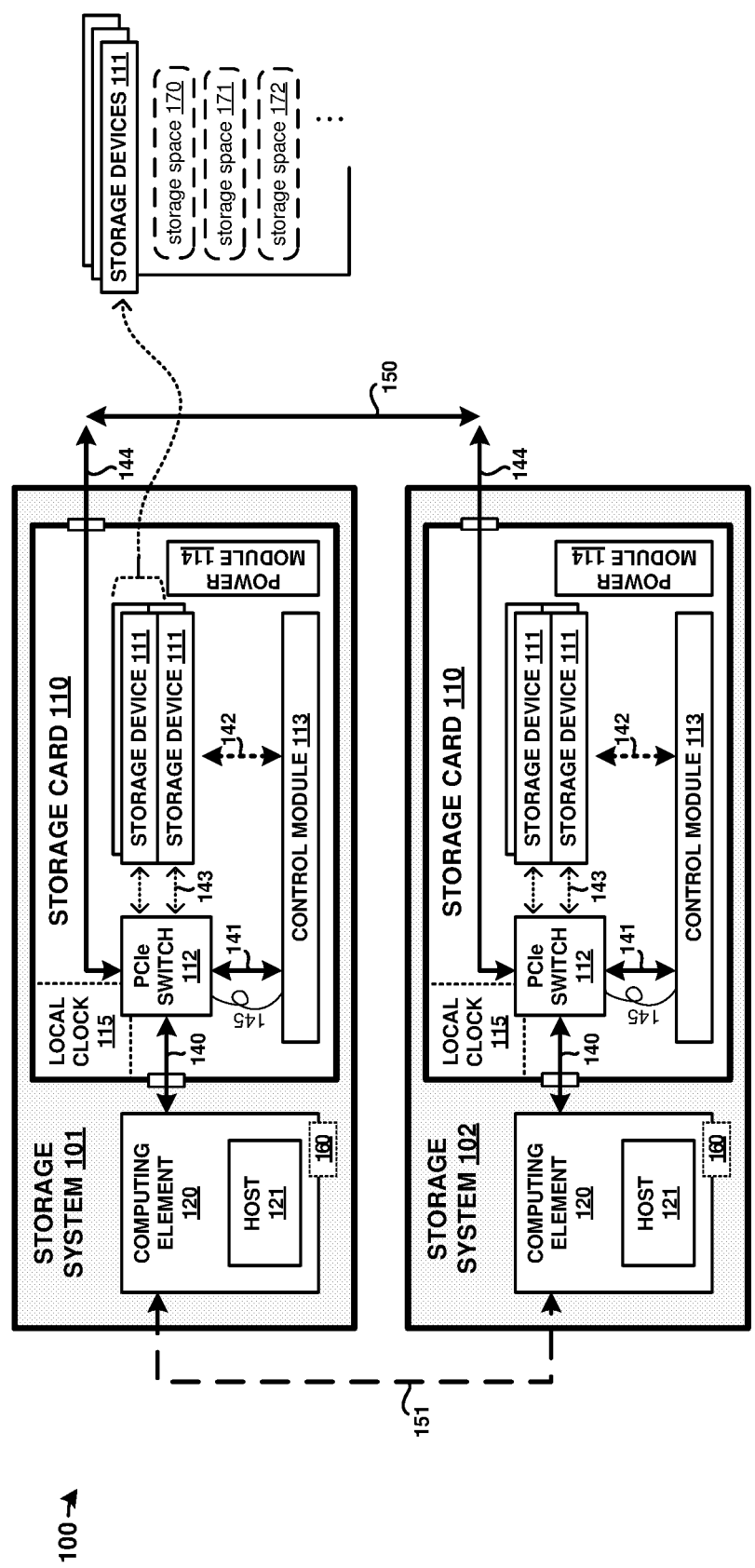
FIG. 1 is a diagram illustrating a storage system in an implementation.

As a first example, FIG. 1 is provided. FIG. 1 illustrates a system diagram of storage environment 100. Storage environment 100 includes at least two storage systems 101-102, although a different number can be included. Each storage system in FIG. 1 is shown to have similar elements, but can have variations in specific implementations. In FIG. 1, two storage systems 101-102 are coupled over a physical link 150 which can include one or more logical links, such as link 151.

Each storage system 101-102 can comprise a computer or server, among other computing devices which can include network-attached storage devices, tablet computers, smartphones, gaming systems, laptop computers, desktop computers, elements of a distributed computing system, or other computing systems. Included in each storage system is a storage system exemplified by storage card 110. Storage card 110 can comprise a plug-in peripheral card, a discrete storage drive, or included and integrated among other elements of the associated computing element. In some examples, storage card 110 can be separate from the associated storage system, and comprise an enhanced storage drive, storage device, or other discrete device or apparatus.

Storage card 110 includes a plurality of storage devices 111, Peripheral Component Interconnect Express (PCIe) switch 112, control module 113, and power module 114. PCIe switch 112 communicates with an associated computing element 120 over PCIe link 140. PCIe switch 112 communicates with control module 112 over PCIe link 141. PCIe switch 112 communicates with one or more storage devices 111 over PCIe link(s) 143. Control module 112 communicates with one or more storage devices 111 over PCIe link(s) 142. The examples below in FIGS. 4-14 illustrate variations on the example shown in FIG. 1. In some of the examples, control module 112 is not coupled directly to storage devices 111 through PCIe links 142, while in other examples, PCIe switch 112 is not coupled directly to storage devices 111 through PCIe links 143. Other variations are possible and discussed in the further examples below.

PCIe switch 112 communicates with a host system or host module over PCIe link 140. PCIe link 140 comprises a PCIe link with at least four lanes, namely a "x4" PCIe link, although a different number of PCIe lanes can be employed. Additionally, more than one PCIe link 140 can be employed for load balancing, redundancy, and failover protection for storage card 110. PCIe switch 112 also communicates with at least four storage devices 111 over associated x4 PCIe links 143. PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling.

PCIe switch 112 comprises one or more PCIe crosspoint switches, which logically interconnect various ones of the associated PCIe links based at least on the traffic carried by each PCIe link. PCIe switch 112 establishes switched connections between any PCIe interfaces handled by PCIe switch 112. Each PCIe switch port can comprise a non-transparent (NT) or transparent port. An NT port can allow some logical isolation between endpoints, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups. In some examples, PCIe switch 112 comprises a PLX Technology PEX8725 10-port, 24 lane PCIe switch chip. In some examples, PCIe switch 112 comprises a PLX Technology PEX8796 24-port, 96 lane PCIe switch chip.

Although PCIe links are used in FIG. 1, it should be understood that additional or different communication links or busses can be employed, such as Ethernet, Serial Attached SCSI (SAS), FibreChannel, Thunderbolt, Serial Attached ATA Express (SATA Express), among other interconnect, network, and link interfaces. Any of the links in FIG. 1 can each use various communication media, such as air, space, metal, optical fiber, or some other signal propagation path, including combinations thereof. Any of the PCIe links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

Storage card 110 can optionally communicate over sideband links. Sideband links can include Universal Serial Bus (USB), SMBus, JTAG, Inter-Integrated Circuit (I2C), controller area network bus (CAN), or any other communication interface, and in some examples is provided over portions of PCIe link 140 or 144.

Each storage device 111 comprises a solid state drive (SSD) in this example, and communicates with external systems over an associated PCIe interface included in each storage device 111. In some examples, each storage device 111 comprises an individual M.2 SSD card, which communicates over an associated PCIe interface 143, although variations are possible. The solid state storage media of storage devices 111 can comprise flash memory, static RAM, NAND flash memory, NOR flash memory, memristors, or other solid state media. Instead of or in addition to solid state media, each storage device 111 can comprise magnetic storage, such as hard disk drives, tape drives, magnetoresistive memory devices, and the like, or can comprise optical storage, such as phase change memory.

Each storage device 111 can receive read transactions and write transactions issued by a host system, such as computing element 120 or host 121. Responsive to a read transaction, each storage device 111 can retrieve data identified by the read transaction and transfer the data for delivery to the associated host. Responsive to a write transaction, each storage device 111 can write data that accompanies the write transaction to storage media associated with storage device 111. Data striping can be employed by storage card 110 to stripe data for a particular write transaction over any number of storage devices 111.

In a particular example, each storage device 111 comprises an M.2 circuit card which is separate from a circuit card of other elements of storage card 110 and includes a mini-PCI Express connector or other connector that interfaces with a connector on storage card 110. In other examples, each storage device 111 comprises one or more flash memory chips with a PCIe interface which is soldered onto storage card 110. In yet other examples, each storage device 111 comprises one or more separate solid state disk drives or magnetic hard disk drives along with associated enclosures and circuitry.

Storage card 110 might comprise a 2.5" form factor drive, a HHHL card (half-height half-length PCIe card) or a FHHL card (full-height half-length PCIe card). Other examples include FHFL card (full-height full-length PCIe card), or HHFL (half-height full length) in other examples. PCIe edge connectors are employed on the HHHL and FHFL cards and insertable into a mating PCIe socket of a host system, such as a motherboard or daughterboard of a computer or server system or computing element 120. U.2 interfaces can be employed which carry PCIe signaling, and can be referred to as SH-8639 interfaces in some examples. Storage cards and associated storage drives discussed herein can include stacked arrangements of M.2 SSDs using two-tier M.2 connector configurations that form a stacked or tiered arrangement, with an SSD on a bottom tier and an SSD on an upper tier. The upper tier can employ taller M.2 sockets or elevated M.2 sockets as compared to the lower tier. The lower M.2 SSDs are positioned underneath the upper M.2 SSDs. The stacked M.2 SSDs form a compact stackup arrangement which can fit into a small stackups and form factors. The M.2 SSDs can comprise either 110 millimeter (mm) or 80 mm sized M.2 SSDs. M.2 end supports hold and structurally supports an end of each M.2 SSD which is opposite of the connector end. Other sizes of M.2 SSDs can be included, such as lengths of 16, 26, 30, 38, 42, 60, 80 and 110 mm and widths of 12, 16, 22 and 30 mm.

Control module 113 comprises one or more microprocessors, processing devices, multi-core processors, processing circuitry, or other processing system. Control module 113 can include one or more non-transitory memory devices, such as RAM, solid state storage, or other memory to store instructions that are executable by control module 113 to operate as discussed herein. In some examples, control module 113 comprises an ARM microcontroller, ARM microprocessor, field-programmable gate array (FPGA), application specific integrated circuit (ASIC), application specific processor, or other microprocessor, microcontroller, or processing elements. Control module 113 can comprise any processing elements discussed below for computing element 200 of FIG. 2. Control module 113 can monitor usage statistics, traffic status, or other usage information through links 141-142. PCIe switch 112 can track this usage information during normal operation and data transfer with storage devices 111, and control module 113 can retrieve this usage information as needed over link 141.

Power module 114 includes circuitry to selectively provide power to any of the elements of storage card 110. Power module 114 can receive control instructions from computing element 120 over PCIe link 140 or from control module 113. In some examples, power module 114 comprises processing elements discussed above for computing element 120, or is included in the elements of control module 113. Power module 114 can receive power for the various elements of storage card 110. Holdup circuitry can be included that comprises energy storage devices for storing power received over a power link for use during power interruption events, such as loss of source power. Holdup circuitry can include capacitance storage devices, such as an array of capacitors.

Power module 114 can receive control instructions from control module 113 of storage card 110 or from other processors or modules, such as over the Inter-Integrated Circuit (I2C), Ethernet, or Universal Serial Bus (USB) sideband interfaces, or over a PCIe interface. Storage card 110 can receive power over one or more power links as a power source for the various elements of storage card 110, and these power links can be included in a PCIe connector of storage card 110. Power module 114 can include processing or control elements similar to control module 113, and in some examples can have associated control elements integrated into control module 113.

Holdup circuitry can be included on storage card 110 to provide power to the storage card when input power has been lost or removed for the storage card. In some examples, the storage card is removed from an associated mating connector and input power is lost due to the removal. In other examples, power is lost to a host system into which storage card 110 is connected, such as during a facility power outage or when an associated power supply fails. Various holdup circuitry is included in power module 114 to selectively provide power to the elements of storage card 110. Holdup circuitry includes energy storage devices for storing power received over the power link for use during power interruption events, such as loss of source power. Holdup circuitry can include capacitance storage devices, such as an array of capacitors.

Storage card 110 can provide self-power during power interruption events. Typically, storage card 110 will use any associated holdup power to commit in-flight write data associated with pending write operations before power down of circuitry of storage card 110. The in-flight write data can be committed to associated storage devices 111, or can be committed to other non-volatile memory such as a non-volatile write cache which can hold write data until power is restored. Once any in-flight write data has been committed to non-volatile memory, then excess or remaining holdup power can be held for future use, bled off into dummy loads, or redistributed to other cards over PCIe power links or other power links.

A local clock domain 115 is also included on each storage card 110. This local clock domain is employed for PCIe transactions handled on storage card 110. PCIe switch 112 can receive transactions, host commands, and data over PCIe link 140 which can be clocked according to a clock domain of a PCIe system of host 121 or computing element 120. However, when host 121 or computing elements 120 become unresponsive, such as due to loss of power, then this clock domain might not be available to storage card 110. Local clock domain 115 is included in storage card 110 to provide a clock domain which can be powered independently of computing element 120, such as when holdup circuitry and holdup power is provided by power module 114. The clock domain crossing can occur in PCIe switch 112, with a PCIe interface associated with link 140 clocked according to a first clock domain and a PCIe interface associated with links 141-143 clocked according to a second clock domain (115). Other clock crossing boundaries can be employed, such as in control module 113, buffer modules, FIFO modules or other circuitry, including combinations thereof. Injected PCIe commands, such as those discussed below, can be injected according to a local clock domain of storage card 110, such as when host power has been lost and storage card 110 is running on internal holdup power. Control module 113 can inject these commands and use clock domain 115 for such injection.

Auxiliary PCIe interface 144 can optionally be included in storage card 110. Auxiliary PCIe interface 144 can be employed to connect two or more PCIe storage cards to each other for transfer of data, storage operations, status, control signaling, operational information, or other data between storage cards, such as two of storage card 110. Auxiliary PCIe interface 144 can comprise a different PCIe bus width or lane allocation than host PCIe interface 140. Additionally, an external PCIe connector can be employed to connect among the various storage cards using associated cabling. In some examples, mini-SAS connectors and cabling are employed and are configured to carry PCIe signaling of auxiliary PCIe interface 144. Auxiliary PCIe interface 144 can also include non-PCIe signaling, such as sideband interfaces or other interfaces. Auxiliary PCIe interface 144 can be used for interconnect among more than one computing element or storage system and can terminate at external connectors, such as mini-Serial Attached SCSI (SAS) HD connectors which are employed to carry PCIe signaling over mini-SAS cabling. Other example connectors include zSFP+ interconnect. In further examples, MiniSAS HD cables are employed that drive 12 Gb/s versus 6 Gb/s of standard SAS cables. 12 Gb/s can support PCIe Gen 3. The external PCIe ports can comprise Quad Small Form Factor Pluggable (QSFFP) or QSFP/QSFP+ jacks or mini-SAS HD jacks over which PCIe signaling is carried when associated cables are employed. PCI connector 161 can comprise mini-SAS connectors that comprise mini-SAS jacks. Associated cabling can comprise SAS cabling which can include associated shielding, wiring, sheathing, and termination connectors.

PCIe interfaces 140 and 144 can carry iSCSI (Internet Small Computer System Interface) or NVMe (Non-Volatile Memory Host Controller Interface Specification Express) traffic issued by a host processor or host system, which might comprise computing element 120 or host 121. iSCSI and NVMe are interface standards for mass storage devices, such as hard disk drives (HDDs) and solid state storage drives (SSDs). iSCSI and NVMe can supplant serial-ATA (SATA) interfaces or other legacy storage interfaces for interfacing with mass storage devices in personal computers and server environments. In the examples discussed herein, a PCIe interface is employed to transport iSCSI or NVMe traffic and present a multi-drive system as one or more iSCSI or NVMe virtual logical unit numbers (VLUNs) over a PCIe interface.

Both iSCSI and NVMe operations can apply in the examples below, as well as native PCIe operations. However, a brief discussion of various operations of each storage card 110 is included using the NVMe terminology. It should be understood that other interface types and logical encapsulation applies. In NVMe operations, such as an NVMe write operation, data can be received over any of PCIe links 140 for any storage device 111. For example, a write operation can be an NVMe write operation received over PCIe link 140 from a device employing an NVMe protocol transported over a PCIe interface. An associated storage drive can receive the NVMe traffic over an associated PCIe interface 143 and respond accordingly, such as with a write confirmation or with read data in the case of an NVMe read operation.

In further examples, control module 113 can handle PCIe traffic for the storage drives over links 142 and manage the storage drives in a logical manner. For example, data striping can be employed by control module 113 to stripe data for a particular write transaction over any number of storage devices 111, such as over all of the storage drives or a subset of the storage drives. Likewise, data redundancy can be employed to mirror data over any of storage devices 111. In further examples, ones of storage devices 111 are presented as one or more logical drives or logical volumes to a host system, such as one or more virtual logical units (VLUNs). Control module 113 can manage striping, mirroring, or logical volume establishment and presentation. In one example, control module 113 receives all PCIe traffic for storage devices 111 over PCIe interface 141 and distributes to appropriate storage devices 111 to achieve striping, mirroring, or logical volumes. In other examples, control module 113 monitors traffic in PCIe switch 112 and instructs PCIe switch 112 to direct PCIe traffic over links 143 to appropriate storage drives to achieve striping, mirroring, or logical volumes.

As mentioned above, control module 113 can present the storage resources of storage card 110 as a VLUN, such as VLUNs. Control module 113 can present any number of VLUNs to an external system over a PCIe interface, such as any of PCIe links 140 or 144. These VLUNs can be presented as an NVMe target. An NVMe target can present the storage resources of storage card 110 as a single storage target, such as emulating a single storage drive, over a PCIe interface. In this manner, a plurality of storage drives that comprise any number of storage devices 111 can be presented as a single NVMe target to an external system over a PCIe interface. Computing element 120 can receive NVMe storage traffic, such as NVMe frames, and distribute these storage transactions for handling by an assigned storage device 111. In other examples, control module 113 monitors NVMe storage traffic in PCIe switch 112 and instructs PCIe switch 112 to direct PCIe traffic to appropriate storage drives to achieve VLUNs or NVMe targets.

Figure 2:
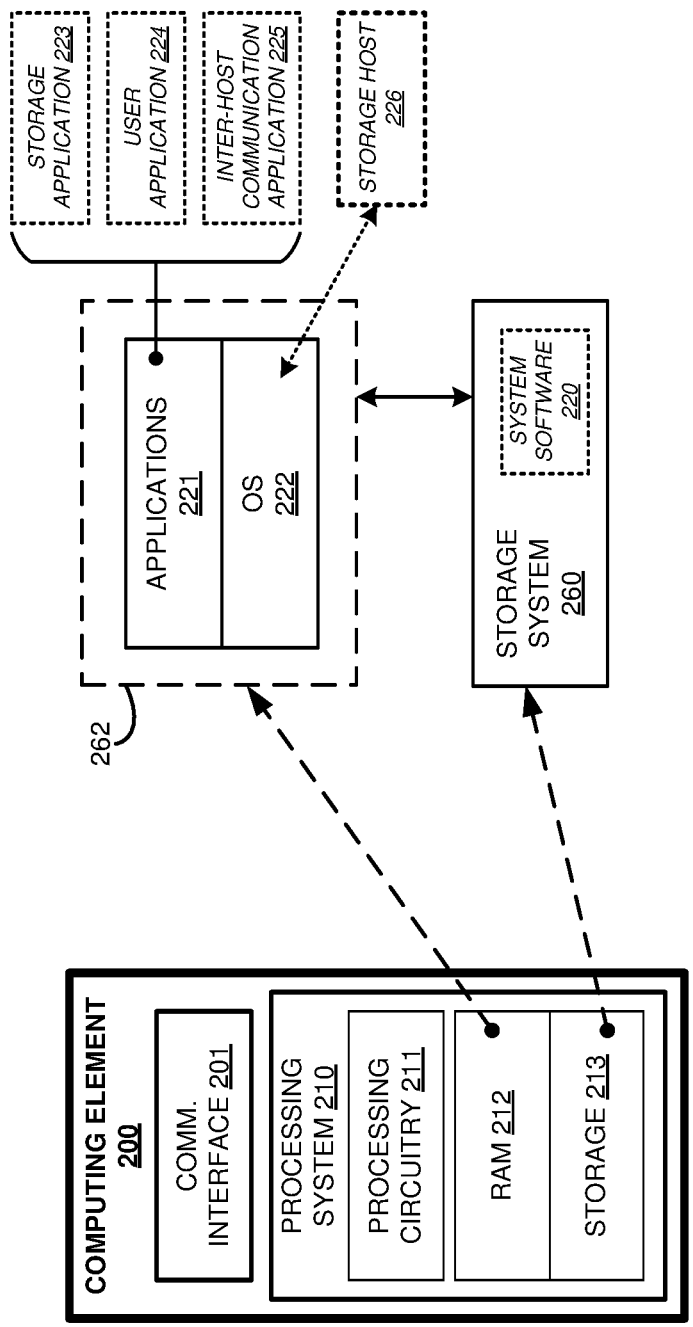
FIG. 2 is a diagram illustrating a computing element in an implementation.

FIG. 2 is s block diagram illustrating computing element 200. Computing element 200 illustrates an example of any of the storage systems, processing systems, or microcontrollers discussed herein, such as processing systems 101-102 in FIG. 1 or control module 113 of FIG. 1.

Control processor 200 includes communication interface 201 and processing system 210. Processing system 210 includes processing circuitry 211, random access memory (RAM) 212, and storage 213, although further elements can be included. Example contents of RAM 212 are further detailed in RAM space 262, and example contents of storage 213 are further detailed in storage system 260.

Processing circuitry 211 can be implemented within a single processing device but can also be distributed across multiple processing devices or sub-systems that cooperate in executing program instructions. Examples of processing circuitry 211 include general purpose central processing units, microprocessors, application specific processors, and logic devices, as well as any other type of processing device. In some examples, processing circuitry 211 includes physically distributed processing devices, such as cloud computing systems.

Communication interface 201 includes one or more communication and network interfaces for communicating over communication links, networks, such as packet networks, the Internet, and the like. The communication interfaces can include PCIe interfaces, serial links, such as SPI links, I2C links, USB links, UART links, or one or more local or wide area network communication interfaces which can communicate over Ethernet or Internet protocol (IP) links. Communication interface 201 can include network interfaces configured to communicate using one or more network addresses, which can be associated with different network links. Examples of communication interface 201 include network interface card equipment, transceivers, modems, and other communication circuitry.

RAM 212 and storage 213 together can comprise a non-transitory data storage system, although variations are possible. RAM 212 and storage 213 can each comprise any storage media readable by processing circuitry 211 and capable of storing software. RAM 212 can include volatile and nonvolatile, removable and non-removable media implemented in any method or technology for storage of information, such as computer readable instructions, data structures, program modules, or other data. Storage 213 can include non-volatile storage media, such as solid state storage media, flash memory, phase change memory, or magnetic memory, including combinations thereof. RAM 212 and storage 213 can each be implemented as a single storage device but can also be implemented across multiple storage devices or sub-systems. RAM 212 and storage 213 can each comprise additional elements, such as controllers, capable of communicating with processing circuitry 211.

Software stored on or in RAM 212 or storage 213 can comprise computer program instructions, firmware, or some other form of machine-readable processing instructions having processes that when executed a processing system direct control processor 200 to operate as described herein. For example, software can drive processor 200 to selectively control delivery of first ones of the storage operations associated with a first host system to a first storage area of the storage devices and second ones of the storage operations associated with a second host system to a second storage area of the storage devices, direct the third ones of the storage operations to a third storage area of the storage devices configured as a communication space for the at least two host systems, inject PCIe control traffic into the PCIe switch for transfer over the associated PCIe interfaces of the storage devices to control a data commit process of the storage devices, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

RAM space 262 illustrates a detailed view of an example configuration of RAM 212. It should be understood that different configurations are possible. RAM space 262 includes applications 221 and operating system (OS) 222. Software applications 223-225 each comprise executable instructions which can be executed by processor 200 for operating a power controller or other circuitry according to the operations discussed herein. Specifically, storage application 223 can provide for originating data read/write operations with storage devices of a storage system discussed herein. These data read/write operations can be prompted from operating system, driver, or other system operations, or can instead be prompted from user activities, such as through user application 224. User application 224 can include productivity applications, data management applications, gaming applications, communication applications, or any other user application. Inter-host communication application 225 provides for host-to-host communication between a first host and a second host using a storage card or storage drive positioned within a first host, or vice-versa. Storage host 226 can comprise a driver, application, operating system element, or other element which can appear as an endpoint on a PCIe interface or other storage interface. Storage host 226 can include any appropriate link/physical layer elements for communicating over the associated PCIe interfaces.

Applications 221 and OS 222 can reside in RAM space 262 during execution and operation of control processor 200, and can reside in storage system 260 during a powered-off state, among other locations and states. Applications 221 and OS 222 can be loaded into RAM space 262 during a startup or boot procedure as described for computer operating systems and applications.

Storage system 260 illustrates a detailed view of an example configuration of storage 213. Storage system 260 can comprise flash memory such as NAND flash or NOR flash memory, phase change memory, magnetic memory, among other solid state storage technologies. As shown in FIG. 2, storage system 260 includes system software 220. As described above, system software 220 can be in a non-volatile storage space for applications and OS during a powered-down state of control processor 200, among other operating software.

Control processor 200 is generally intended to represent a computing system with which at least software 220 are deployed and executed in order to render or otherwise implement the operations described herein. However, control processor 200 can also represent any computing system on which at least software 220 can be staged and from where software 220 can be distributed, transported, downloaded, or otherwise provided to yet another computing system for deployment and execution, or yet additional distribution.

Figure 3:
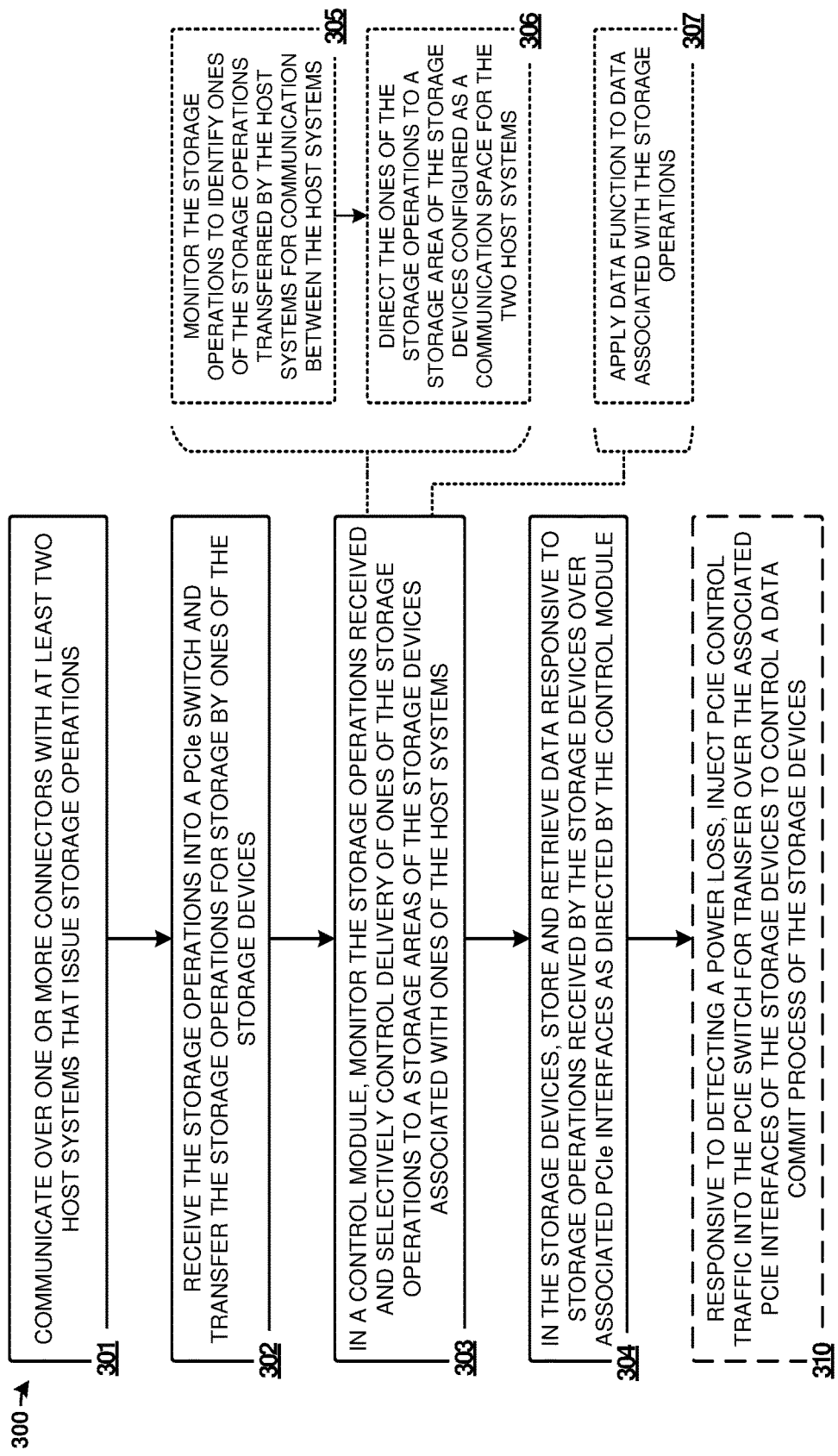
FIG. 3 is a flow diagram illustrating methods of operating a storage system.

FIG. 3 illustrates example operation of elements of FIGS. 1 and 2, which can also be implemented in the elements of FIGS. 4-14. For purposes of clarity, the operations of FIG. 3 will be discussed in the context of the elements of FIG. 1. In FIG. 3, storage card 110 communicates (301) over one or more connectors with at least two host systems that issue storage operations. These connectors can be associated with PCIe links 140 and 144. One connector can be an 'internal' connector for communication with a CPU or host of storage system 101, while another connector can be an 'external' connector for communication with a CPU or host of storage system 102. In the example shown in FIG. 1, each storage system 101, 102, can have separate enclosures and can each comprise discrete computers, servers, or computing devices. However, each storage card 110 can provide for an external connector which allows an external host/CPU to access the storage resources of another host/CPU. Storage operations can be generated internally for each storage system and transferred to the internal storage card 110. Storage operations can also be generated internally for each storage system and transferred over an external link of storage card 110 to another storage card in a different storage system.

Storage card 110 receives (302) the storage operations into PCIe switch 112 and transfers the storage operations for storage by ones of the storage devices. For example, the storage operations can originate in either storage system 101 or 102 and be received by a storage card 110 in the same storage system or different storage system as originated. The PCIe switch of the storage card which receives the storage operations can transfer the storage operations for storage.

To provide enhanced sharing of the storage spaces of the associated storage devices 111, control module 113 can be employed. Control module 113 can have a serial ("type-B" or "store and forward") configuration found in FIGS. 8-12, or a parallel ("type-A") configuration found in FIGS. 5-7. The serial configuration passes the storage operations through a processor, FPGA, or microcontroller of control module 113 before reaching storage devices 111. The parallel configuration allows control module 113 to monitor storage operations transiting PCIe switch 112 and direct the storage operations using PCIe switch 112 or other elements. However, in some examples, the parallel configuration employs host involvement or host software/driver changes to implement.

Control module 113 monitors (303) the storage operations received and selectively controls delivery of ones of the storage operations to storage areas of the storage devices associated with ones of the host systems. Specifically, one or more storage spaces 170-172 can be defined across storage devices 111. These storage spaces 170-172 can comprise partitions, logical spaces, or other distinctions. Moreover, a single storage space might be shared by more than one host or storage system, and control module 113 can control the storage operations and storage devices 111 for proper transfer of the storage operations. Further examples of this are seen in FIGS. 4-14.

In a further example, control module 113 monitors (305) the storage operations to identify ones of the storage operations transferred by the host systems for communication between the host systems. In this manner, storage operations (or other PCIe traffic) can be employed for communication between hosts or storage systems—similar to a network connection, but via storage spaces of storage devices 111 handled by control module 113. In FIG. 1, link 151 illustrates a logical link established between associated computing elements 120 of storage system 101-102 using control module 113 of any of the associated storage cards. It should be understood that the communication can be established using a separate storage space in the associated storage devices 111 or established using elements of control module 113, including combinations thereof. Thus, in a particular example, control module 113 directs (306) the ones of the storage operations to a storage area of the storage devices configured as a communication space for the two host systems.

In yet further examples, control module 113 applies (307) data functions to data or data payloads associated with the storage operations. For example, control module 113 can apply a compression scheme or compression algorithm to data associated with storage operations directed to storage devices 111. In other examples, redundancy schemes, deduplication schemes, RAID schemes, striping schemes, encryption schemes, encoding schemes, error checking and correction schemes, or other data modification, obfuscation, redundancy, or protection schemes can be employed before storage of the data on the associated storage devices 111. During read operations, control module 113 can responsively apply the one or more data functions to return the stored data to a form readable by an associated host system.

Once control module 113 has processed the data associated with the storage operations and determined to which storage space, if any, the storage operations are to be directed, then the storage devices 111, stores data responsive to write storage operations received by the storage devices over associated PCIe interfaces as directed by control module 113. Likewise, storage devices 111 might retrieve data responsive to read storage operations directed to storage devices 111 by control module 113.

Furthermore, control module 113 can provide further features for storage card 110. For example, control module 113 or elements of power module 114, can monitor a power state of storage system 101, 102, or storage card 110. Responsive to detecting a power loss, power interruption, or other power condition, control module 113 injects (310) PCIe control traffic into the PCIe switch for transfer over the associated PCIe interfaces of the storage devices to control a data commit process of the storage devices. Holdup capacitance or other holdup elements can allow storage card 110 to remain powered for a brief time after a source power has failed or been removed. During this holdup time, data in flight on card 110 and in cache portions of storage devices 111 can be committed to more permanent storage media of storage devices 111, such as onto non-volatile storage media instead of a volatile cache.

Control module 113 can inject control traffic onto the PCIe interfaces of the storage devices using PCIe switch 112. In some examples, this control traffic is injected using a sideband or control interface of PCIe switch 112 which is not a PCIe interface, such as I2C, USB, or other non-PCIe interfaces 145 that communicatively couple control module 113 and PCIe switch 112. The sideband interface can allow control module 113 to instruct PCIe switch 112 to perform PCIe interface 'exercises'—such as using a 'bus exerciser' function that can place specified bit patterns onto selected PCIe links responsive to instructions of control module 113 to PCIe switch 112.

Instructions issued over the non-PCIe interface 145 can prompt PCIe switch 112 to issue one or more PCIe transactions to storage devices 111 over associated PCIe links. Specifically, NVMe frames or PCIe transaction layer packets (TLPs) can be injected onto PCIe links that are coupled to storage devices 111 to instruct those storage devices to flush cache elements, power down, or enter low power/standby modes, among other operations. These instructions can prompt storage devices 111 to commit in-flight data or write cached data to non-volatile memory, power down gracefully, or other functions, including combinations thereof. In further examples, control module 113 is coupled to PCIe switch 112 or to storage devices 111 over PCIe interfaces and can issue one or more instructions over the associated PCIe interfaces for handling graceful power down and in-flight data commit. However, in PCIe examples, control module 113 can 'masquerade' as an associated host system that has previously been communicating with the storage devices so the storage devices accept the PCIe traffic that originates from control module 113 instead of the host system.

In a further example operation, control module 113 provides host-to-host communication among two or more hosts 121 and provides for two or more hosts 121 to share a storage space, such as storage space 170. In this example, the control module provides host-to-host communication based at least in part on storage operations directed to the control module using an address-based scheme to detect 'signaling' storage operations among the storage operations. The host-to-host communication in this example comprises resource locking communications for storage resource exclusivity among shared storage space 170 shared among the two host systems and provided by one or more storage devices 111. Responsive to a first host system establishing a resource lock on the shared storage space, control module 113 directs storage operations issued by the first host system to the shared storage space and blocks storage operations issued by a second host system from the shared storage space. Responsive to the first host system releasing the resource lock on the shared storage space or the second host system establishing the resource lock on the shared storage space, control module 113 directs storage operations issued by the second host system to the shared storage space and blocks storage operations issued by the first host system from the shared storage space. The resource lock can comprise a flag, semaphore, or other data element that is stored in memory elements of control module 113, in the shared storage space, or another storage space.

Turning now to FIGS. 4-14, the various configuration of storage elements, control elements, and PCIe switching elements can be employed to provide single/multi-name spaces for storage devices located in a first storage system or second storage system external from the first storage system. Cross communication between multiple hosts can be achieved using in-band PCIe traffic using a shared storage space that couples more than one host over PCIe interfaces. Host-to-host locking mechanisms can be avoided on the host systems themselves, as associated control features (control modules, microcontrollers, embedded CPUs, or FPGAs) handle flow control and resource management for more than one host to access the same set of storage devices or storage drives. Moreover, since control is handled at the hardware level, i.e. in an associated control module of a drive or card, then no additional software drivers or user applications are required at the host. This can advantageously lead to increased performance, more streamlined host architectures, and reduced latency for the associated storage operations. In examples where data compression, redundancy (i.e. RAID), striping, deduplication, or encryption are employed, the control features can provide these features without overhead or processing slowdowns in an associated host system. Various memory external to the associated control module, microcontroller, FPGA, or other control element might be employed to provide some of these enhanced features.

The examples in FIGS. 4-14 illustrate example storage interposers, which 'interpose' PCIe functionality between a host system or user CPU and associated storage elements, such as storage drives or storage devices. Some of these interposers work with features or software on the host to provide enhanced functionality for a storage system, while others can work independently of any host system or host system software.

Figure 4:
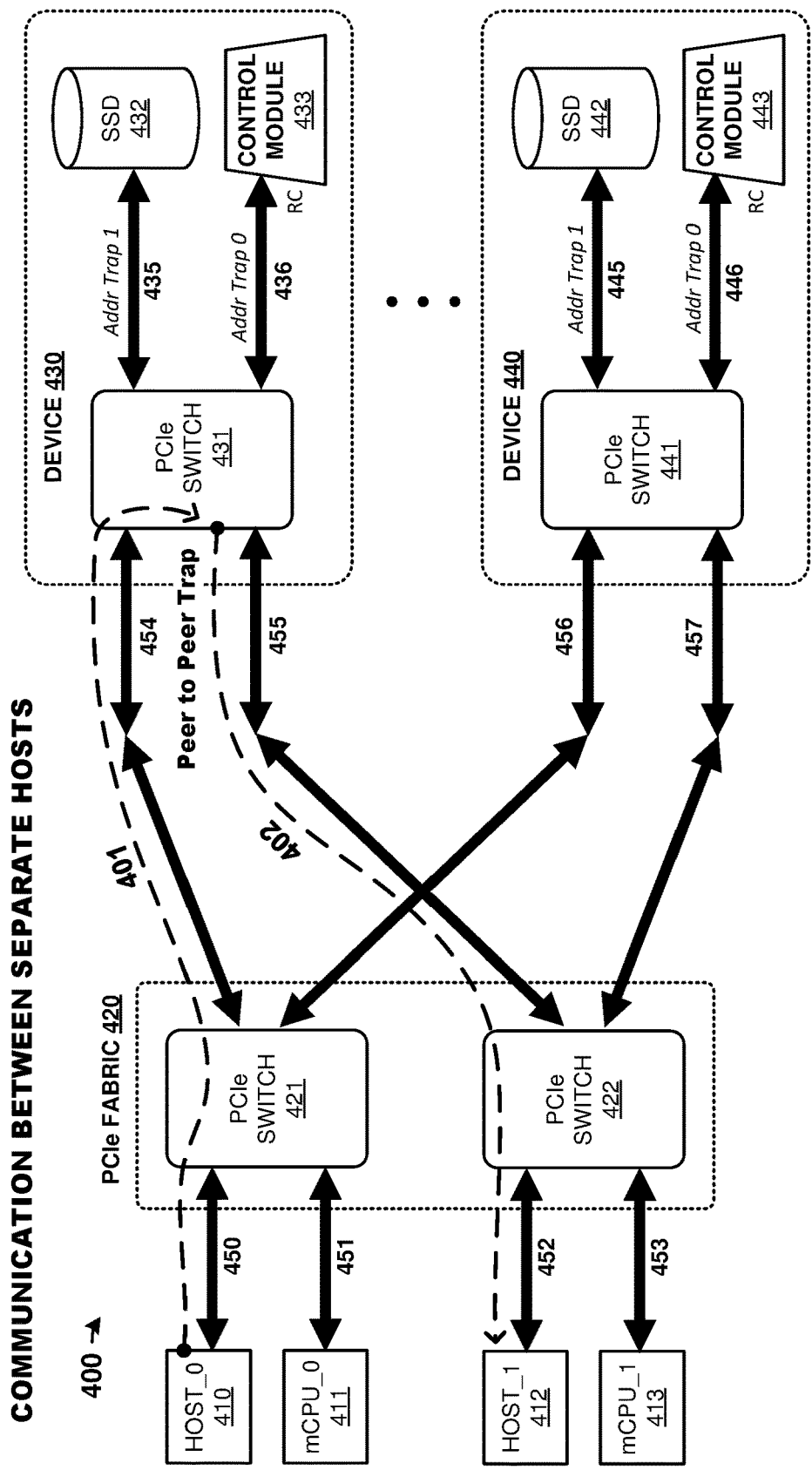
FIG. 4 is a diagram illustrating a storage system in an implementation.
Figure 13:
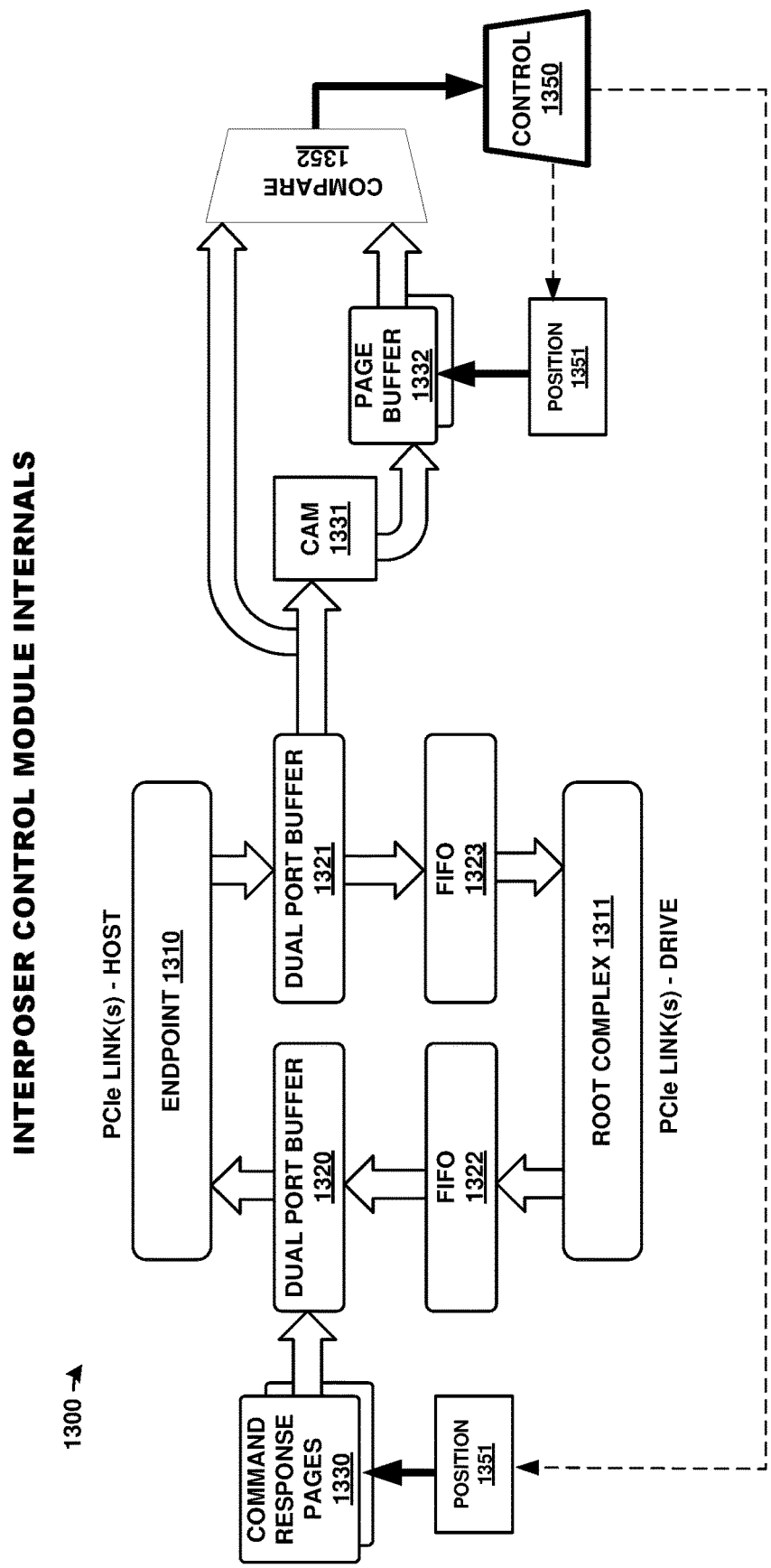
FIG. 13 is a diagram illustrating a storage system in an implementation.
Figure 14:
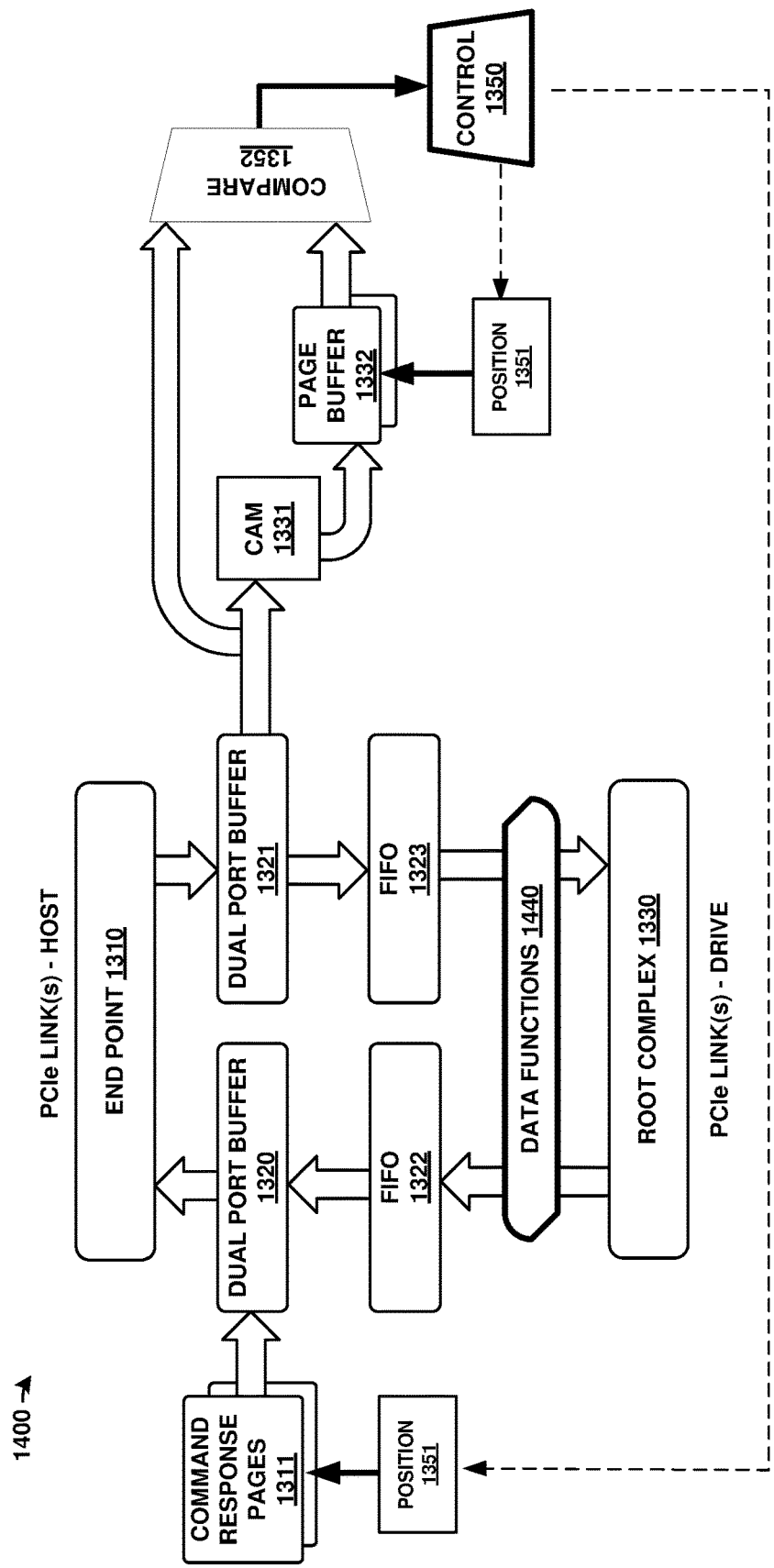
FIG. 14 is a diagram illustrating a storage system in an implementation.

FIG. 4 illustrates a connection diagram for storage cards to provide for coupling of two or more hosts together via PCIe interfaces. FIGS. 5-12 illustrate various architectures for providing the enhanced operations discussed herein, and can comprise various elements seen in FIGS. 1-2. FIGS. 13-14 illustrate example control module internal structure, such as an FPGA, microcontroller, microprocessor, or discrete circuitry might employ to provide portions of the enhanced operations discussed herein. In FIGS. 5-12, various connectors and interfaces are shown, such as U.2 (e.g. SFF-8639) or M.2 connectors and interfaces. However, these connectors and interfaces are merely exemplary, and it should be understood that other connectors and interfaces can be used.

Figure 5:
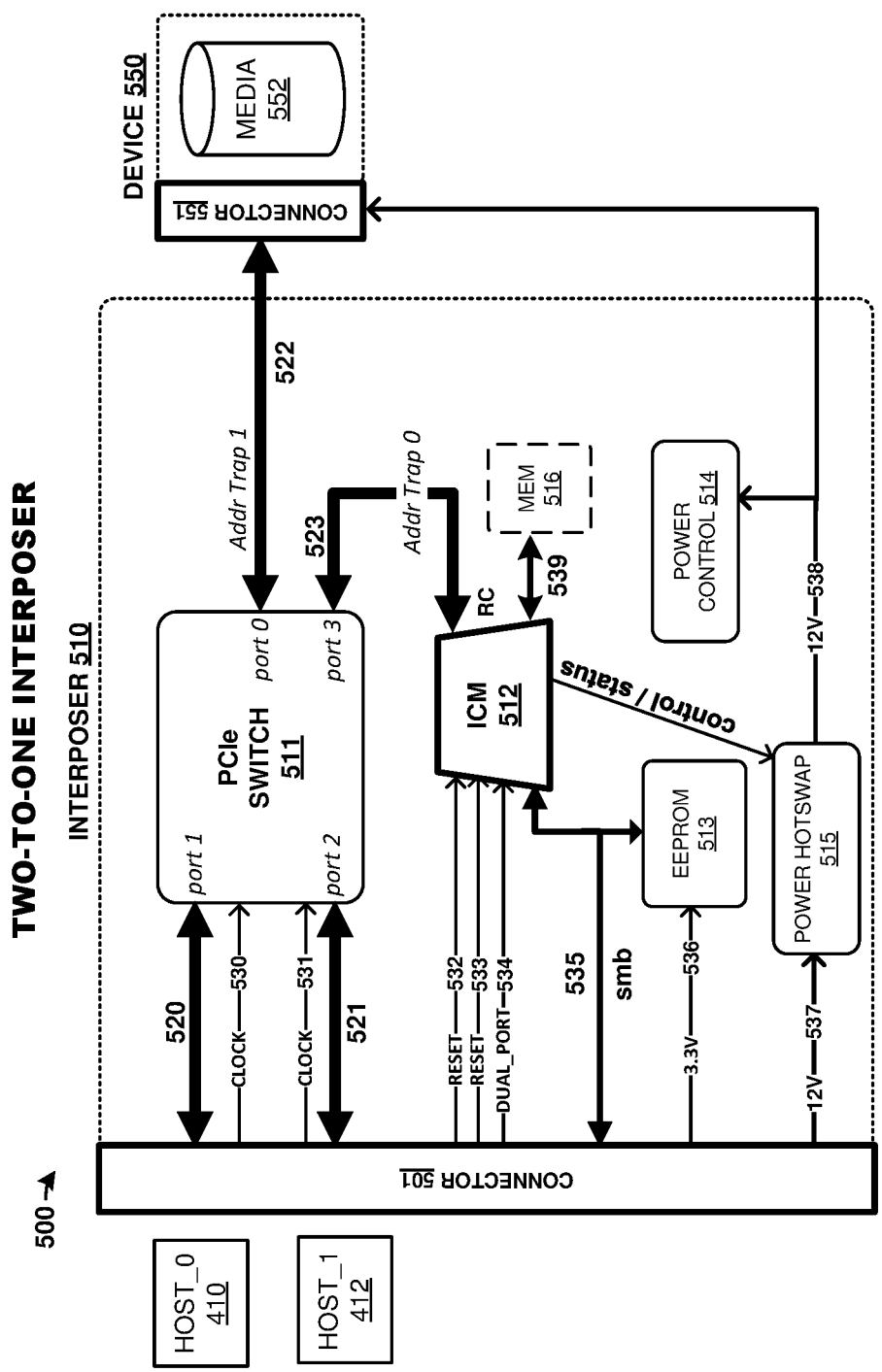
FIG. 5 is a diagram illustrating a storage system in an implementation.
Figure 6:
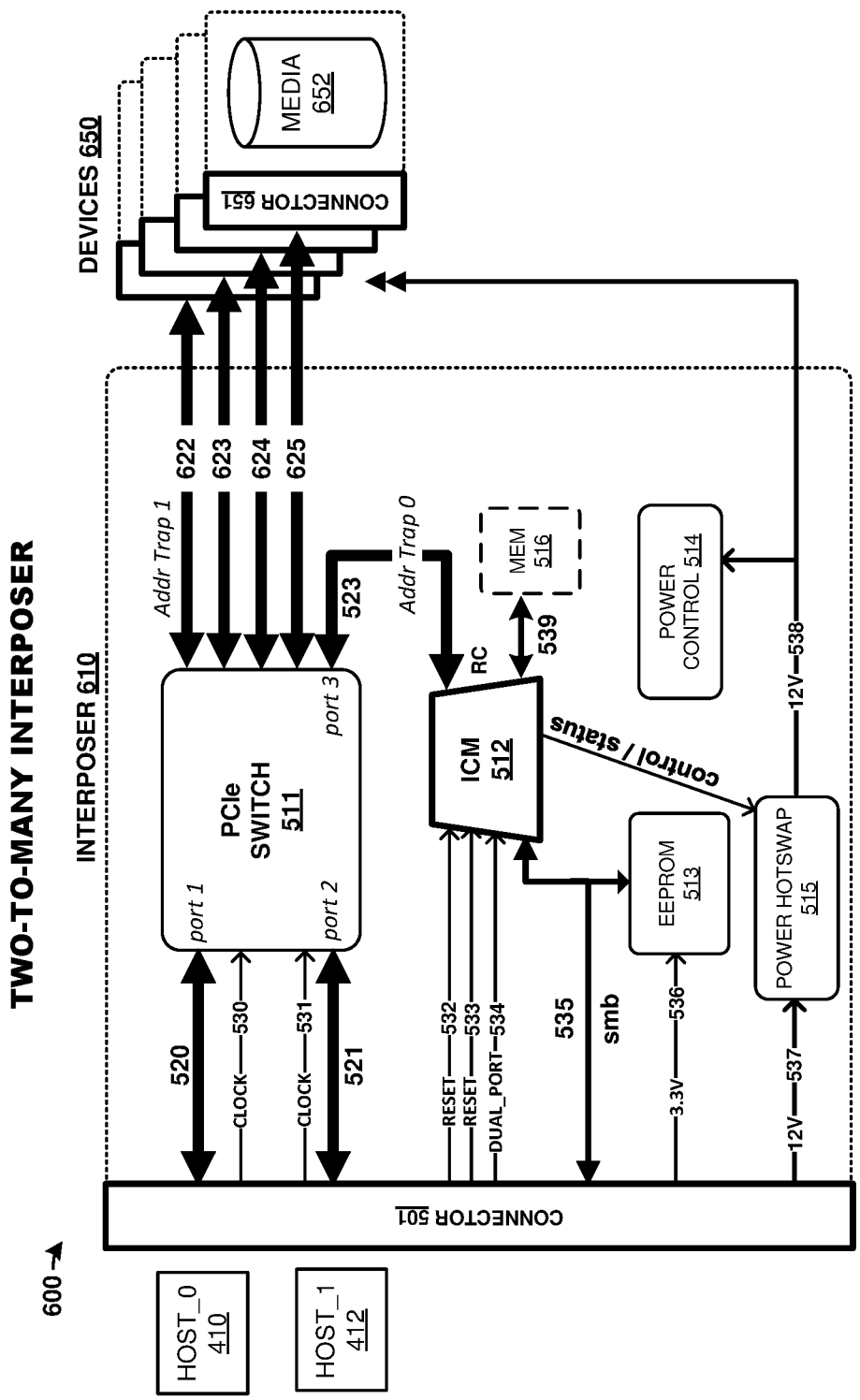
FIG. 6 is a diagram illustrating a storage system in an implementation.
Figure 7:
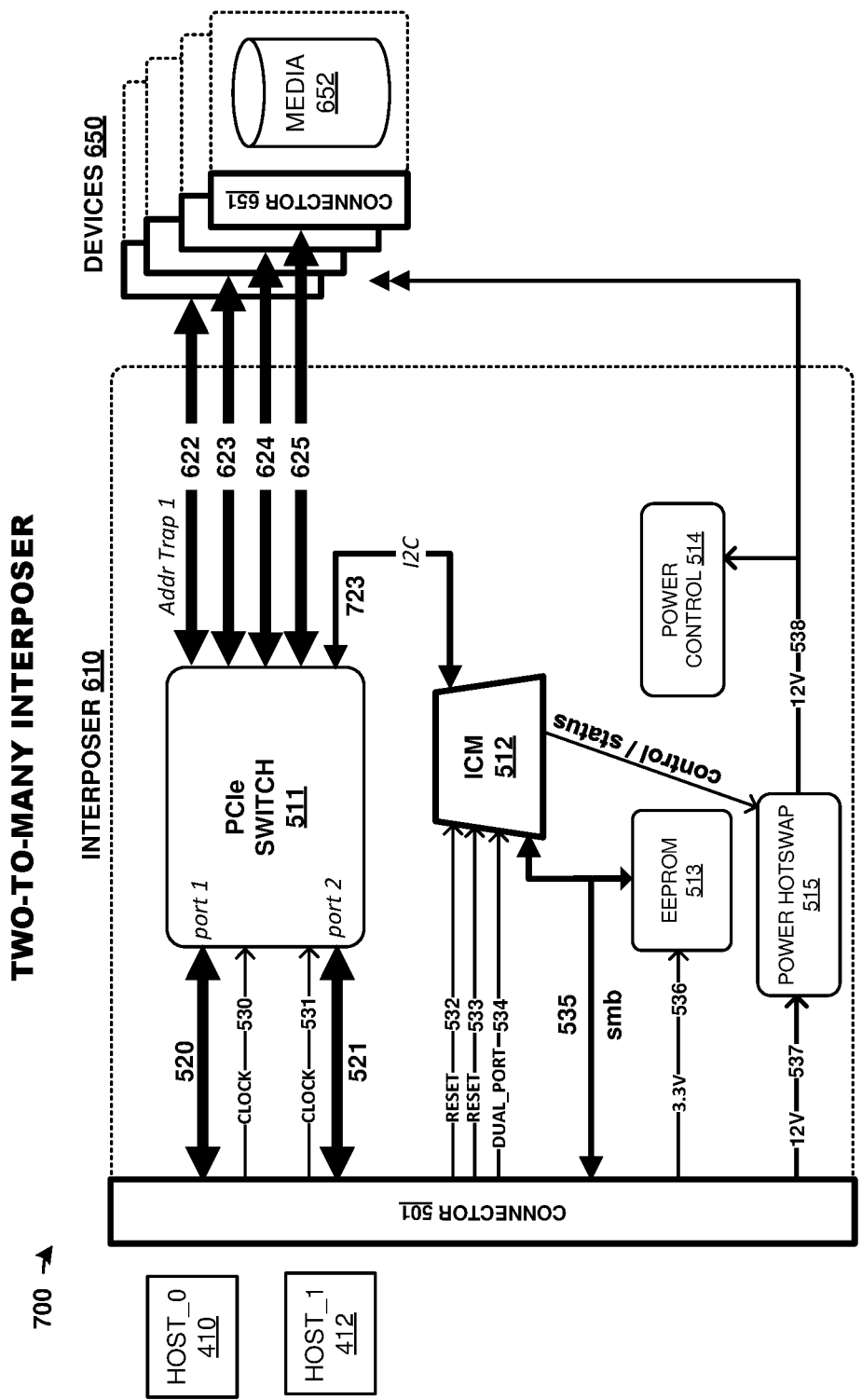
FIG. 7 is a diagram illustrating a storage system in an implementation.

In FIGS. 5-7, a 'type-A' interposer is presented which provides inter-communication between hosts via in-band PCIe commands. In these examples, a control module (CM) or interposer control module (ICM), which might comprise an FPGA, microprocessor, or microcontroller (μC), does not receive storage operations and transfer the storage operations. Instead, these control elements direct operation of PCIe switches by monitoring traffic or by instruction from host elements comprising software, drivers, and the like. These type-A configurations can employ resource locking on associated hosts to share storage spaces. However, the type-A configurations can provide synchronization of administration queues and namespaces between hosts.

In contrast, FIGS. 8-12 illustrate 'type-B' or store-and-forward processing configurations. These type-B configurations place an ICM inline with data pathways between a host and storage devices. Host involvement is not required in the type-B configurations, and no additional or specialized software/drivers need be employed on the associated hosts, as the control module elements can provide these features on the fly.

Turning to FIG. 4, system 400 illustrates a connection diagram which couples at least two hosts 410/412 together via PCIe links and a PCIe switch fabric to at least two storage devices 430/440. System 400 includes host devices 410/412, management CPUs (mCPU) 411/413, PCIe fabric 420, device 430, and device 440. PCIe links 450-457 and 435, 436, 445, and 446 comprise one or more lanes of a PCIe interface, although other links can be employed. In some examples, links 450-453 comprise second generation (Gen2) x1 style of PCIe links, links 454-457 comprise third generation (Gen3) x2 PCIe links, links 435 and 445 comprise Gen2 x4 PCIe links, and links 436/446 comprise Gen2 x2 PCIe links. PCIe switches 421-422 comprise switch circuitry that is configured to communicatively couple links 450-457 using PCIe communications. Each device 430/440 also includes a separate PCIe switch (431/441) that provides similar functionality to PCIe switches 421/422. In some examples, functionality of PCIe switch 421 is included in host 410 and functionality of PCIe switch 422 is included in host 412.

Management central processing units (mCPUs) 411 and 413 are also included in FIG. 4. An associated host 410/412 can communicate with an associated mCPU 411/413. The associated mCPU manages telemetry and command passing, such as with control modules 433/443 or other elements. mCPUs 411/413 can comprise microprocessors, CPUs, discrete logic, programmable logic, or other devices.

Each device 430/440 can comprise a storage device that includes an associated solid state drive (SSD) 432/442, PCIe switches 431/441, and control modules 433/443, along with associated links. Control module 433/443 is employed in an associated device 430/440 to provide peer-to-peer 'trap' functionality, which might instead be provided external to the associated devices as an 'interposer' module or interposer adapter. The control module can monitor PCIe traffic handled by the associated PCIe switch 431/441, such as to determine when the PCIe traffic originates from a particular host, is directed to a particular storage area, or comprises administrative or communication traffic transported over PCIe. This PCIe traffic can be directed to storage areas of the associated SSD or to another host when inter-host communication is desired.

To provide the 'trap' functionality, an associated PCIe switch 431/441 can be configured to redirect PCIe traffic associated with particular predetermined addresses or ranges to another destination, such as to a control module or an interposer module instead of a storage device or SSD. This trap functionality can allow a control module 433/443 to monitor for traffic used for administrative purposes or for inter-host communication. This trap functionality can be employed to allow more than one host to share a common storage space on a single SSD or storage device, allowing for semaphore data locking or interrupt/doorbell functionality to inform one host that a particular storage space is locked by another host. This can effectively prevent inadvertent data overwriting and destruction. In some examples, a write by a first host into a particular PCIe address range will prompt a flag to be written to another host over an associated PCIe interface, such as flag 160 in FIG. 1. This flag can indicate that a storage space is locked, or alternatively can indicate when a storage space is unlocked, among other indications. A driver or process handled by an operating system or other software system of each host might be employed on each host to monitor for the flag indicating the associated action or locking state.

In a particular example, PCIe switch 431 and control module 433 can provide for storage 'interposer' features in device 430. A first host might 410 issue an access request 401 to write to a particular storage space shared with a second host. That first host can write to an address range that is 'trapped' by the storage interposer and redirected to a control module of the storage interposer. In FIG. 1, this trap can comprise a peer-to-peer trap indicated by "addr trap 0" in device 430, and direct some PCIe traffic originally directed to SSD 432 to instead be delivered to control module 433. Another address trap ("addr trap 1") can be employed for normal traffic, such as storage/control operations, for the storage devices or SSDs 432/442.

Control module 433 can then interpret the traffic 401 as an access request to issue a flag 402 to the second host 412 which is monitoring for such activity in a particular address range on second host 412. This flag can comprise an interrupt, doorbell, message, and the like, and can be polled or interrupt-driven. Second host 412, responsive to the flag, can relinquish access to the requested resource (i.e. storage space) and indicate this to first host 410 using a write to a particular address which is similarly 'trapped' by the storage interposer. Control module 433 can then indicate to first host 410 that first host 410 has exclusive use of the resource, such as a storage space or address range of SSD 432. A similar process can occur when second host 412 desires to access that resource. Moreover, the 'trap' functionality can also place a 'block' on the resource itself so that further unauthorized access to that resource cannot proceed until the handshaking described above completes. Alternative arrangements include an inline control module monitoring activity on PCIe interfaces to establish the traps instead of including a PCIe switch in the trap process. In this alternative arrangement, the hosts might require less (or no) driver/software for the handshaking, enabled by more sophisticated circuitry in the storage interposer.

FIG. 5 illustrates system 500 which employs interposer 510 with interposer control module (ICM) 512 to provide address trap functionality for a dual port storage device in a storage interposer. ICM 512 can be an example implementation of control module 113 in FIG. 1, or computing element 200 of FIG. 2, although variations are possible. In FIG. 5, interposer 510 is placed between hosts and storage devices, such as storage device 550, but ICM 512 is not inline with PCIe traffic between the hosts and storage devices. Storage device 550 might be a storage drive, SSD, HDD, or other storage device with single-port capability, and includes connector 551 as well as storage media 552. Interposer 510 can thus provide for dual-port features and functionality for device 550 as well as other enhanced features. In this example, the dual ports comprise two PCIe interfaces provided over U.2 connector 501 which are communicatively coupled to one or more host devices over associated PCIe links. Another U.2 connector couples to device 550.

Further elements of interposer 510 include PCIe switch 511 which can provide for address trap features to allow control of PCIe traffic flow by ICM 512. ICM 512 includes root complex (RC) functionality for PCIe link 523. Other elements of interposer 510 include clock signaling 530-531, reset signaling 532-533, and various input voltages 536-537 of 3.3 VDC and 12 VDC, respectively. Dual-port enable signal 534 is employed by connector 501 to indicate whether or not dual-port features are supported by the connected device. Normally, if device 550 was employed without interposer 510, dual-port enable signal 534 would indicate non-support of dual-port features. However, when interposer 510 is employed, this signal can indicate that dual-port features are supported.

EEPROM (electrically-erasable programmable read-only memory) 513, memory 516 can provide support functionality for ICM 512, such as storage of firmware, memory buffers, FIFO functionality, or other features discussed herein. Use of memory 513 can provide for features discussed in FIGS. 13-14, among other enhanced operations. These features and operations include various data functions, redundant array of independent disk (RAID) functionality, deduplication, compression features, or other data handling features. EEPROM 513 and ICM 512 can interface over one or more SMBus interfaces 535, as well as with a host or other device over U.2 connector 501.

Various power control and power holdup features can be provided by elements 514 and 515, such as those discussed above for power module 114 and control module 113. Elements 514 and 515 can provide voltage regulation and holdup circuitry, as well as power hot swap functionality to device 550. Interposer 510 can provide a PCIe interface 522 and power signals 538 for use by device 550. In some examples, a mating U.2 connector can be provided into which connector 551 is inserted and at least signals 522 and 538 are provided.

In FIG. 5, PCIe switch includes at least PCIe ports 0-3. Ports 1-2 provide dual-port functionality over U.2 connector 501 and interface with up to two hosts. Port 0 interfaces with device 550, and port 1 interfaces with ICM 512. In some examples, PCIe links 520-521 each comprise Gen3 PCIe x2 links, PCIe link 522 comprises a Gen3 PCIe x4 link, and PCIe link 523 comprises a Gen2 PCIe x2 link. Thus, two x2 PCIe links are provided for the dual-port features and feed into a single x4 PCIe link for device 550. PCIe link 523 is provided for ICM 512 to provide the address trap features and dual-port handling described herein.

FIG. 6 illustrates system 600 with some similar elements as FIG. 5, but illustrates storage interposer 610 that provides dual port functionality over U.2 interface 501 for multiple M.2 storage devices 650 that each include connectors 651 and storage media 652. FIG. 7 illustrates system 700 with similar elements as FIGS. 5-6, but ICM 512 communicates with PCIe switch 511 using I2C interface 723 instead of a PCIe interface. Additionally, the elements of FIGS. 6 and 7 can be included on an add-in card, such as a half-height, half-length (HHHL) or similar-sized PCIe expansion card. In some examples, PCIe links 622-625 each comprise Gen3 PCIe x4 links. Thus, two x2 PCIe links are provided for the dual-port features and feed into four x4 PCIe links for devices 650. Interposer 610 can provide a PCIe interfaces 622-625 and power signals 538 for use by devices 650. In some examples, individual mating M.2 connectors can be provided into which connectors 651 are inserted and at least signals 622-625 and 538 are provided.

Figure 8:
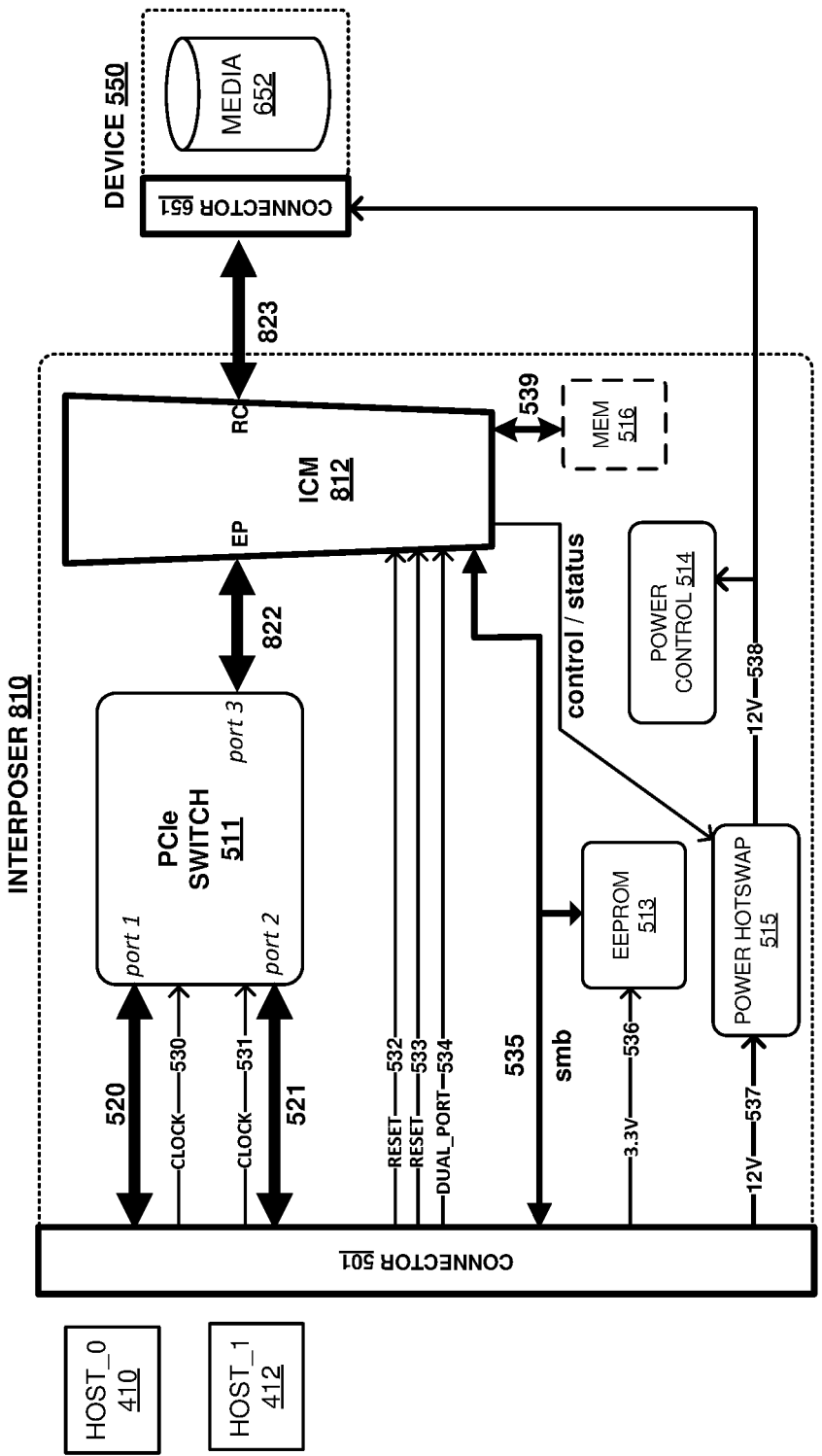
FIG. 8 is a diagram illustrating a storage system in an implementation.
Figure 9:
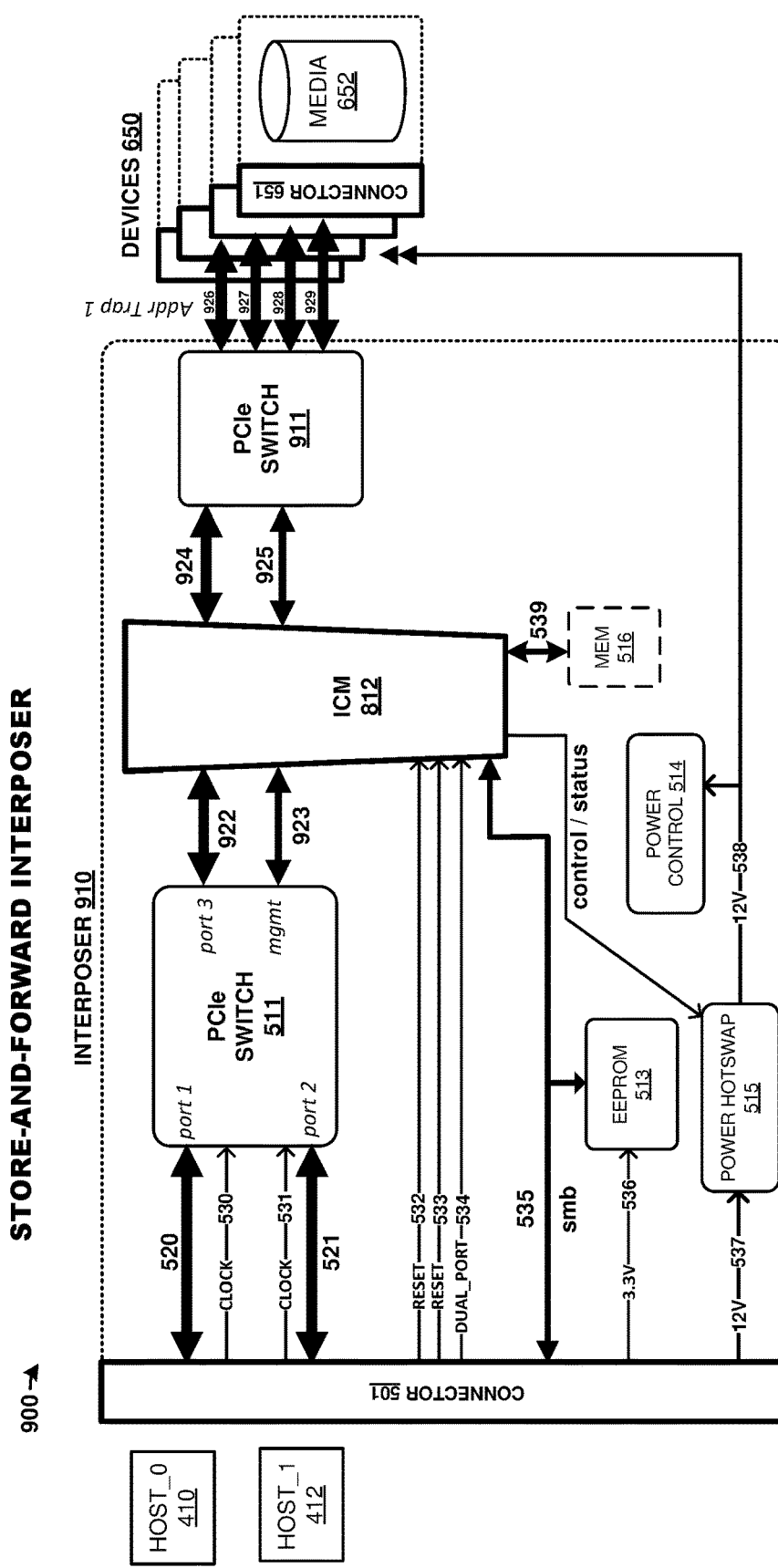
FIG. 9 is a diagram illustrating a storage system in an implementation.

FIG. 9 illustrates system 900 with similar elements as in FIG. 8 but instead provides dual port PCIe functionality to one or more M.2 interfaced SSDs with interposer 910. Additionally, system 900 includes a front-end PCIe switch circuit 511 and back-end PCIe switch circuit 911. System 900 places ICM 812 between PCIe switch 511 coupled to a U.2 connector and PCIe switch 911 coupled to one or more storage devices over mating connectors, such as devices 650 over PCIe links 926-929. This configuration provides a storage interposer which can offer dual port functionality to a plurality of single port M.2 SSDs. Moreover, the store and forward architecture can eliminate a need for host-side drivers or software which elements in FIGS. 5-7 might employ to provide the dual port features. In some examples, PCIe links 922/924 each comprise a Gen2 or Gen3 PCIe x4 link, and PCIe links 923/925 each comprise a PCIe management link, such as a Gen2 PCIe x2 link seen in FIG. 5 for link 523. PCIe links 926-929 can comprise Gen3 PCIe x4 links.

Figure 10:
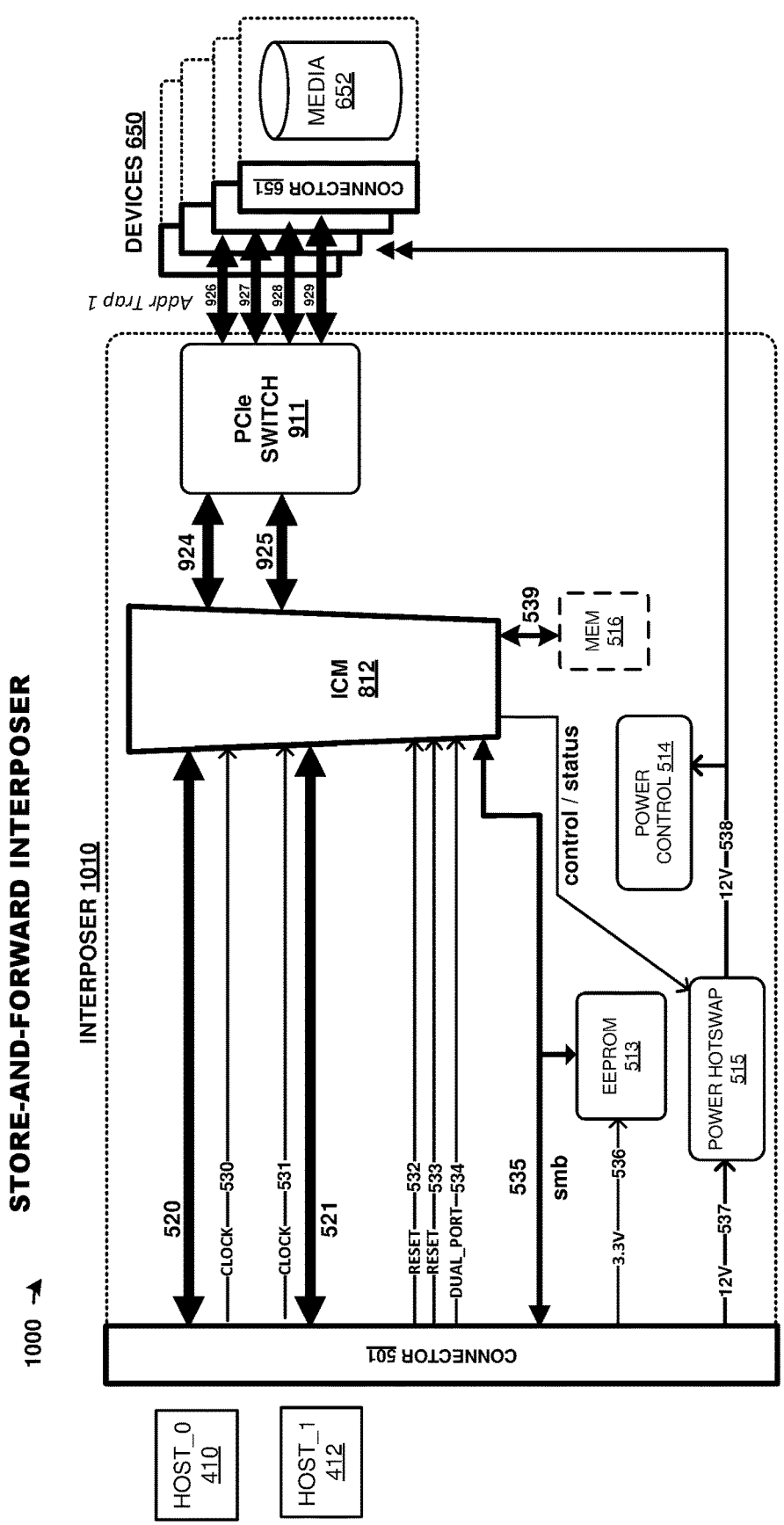
FIG. 10 is a diagram illustrating a storage system in an implementation.

FIG. 10 illustrates system 1000 with similar elements as FIG. 9 but with a single back-end PCIe switch 911 provided by interposer 1010. ICM 812 in FIG. 10 might include PCIe interface or PCIe switching features to reduce the need for a front-end PCIe switch, as seen in FIG. 9. System 1000 places ICM 812 between a U.2 connector and PCIe switch 911 coupled to one or more storage devices over mating connectors, such as devices 650 over PCIe links 926-929. This configuration provides a storage interposer which can offer dual port functionality to a plurality of single port M.2 SSDs with a lower part count by eliminating PCIe switch 511 and rolling such functionality into ICM 812.

Figure 11:
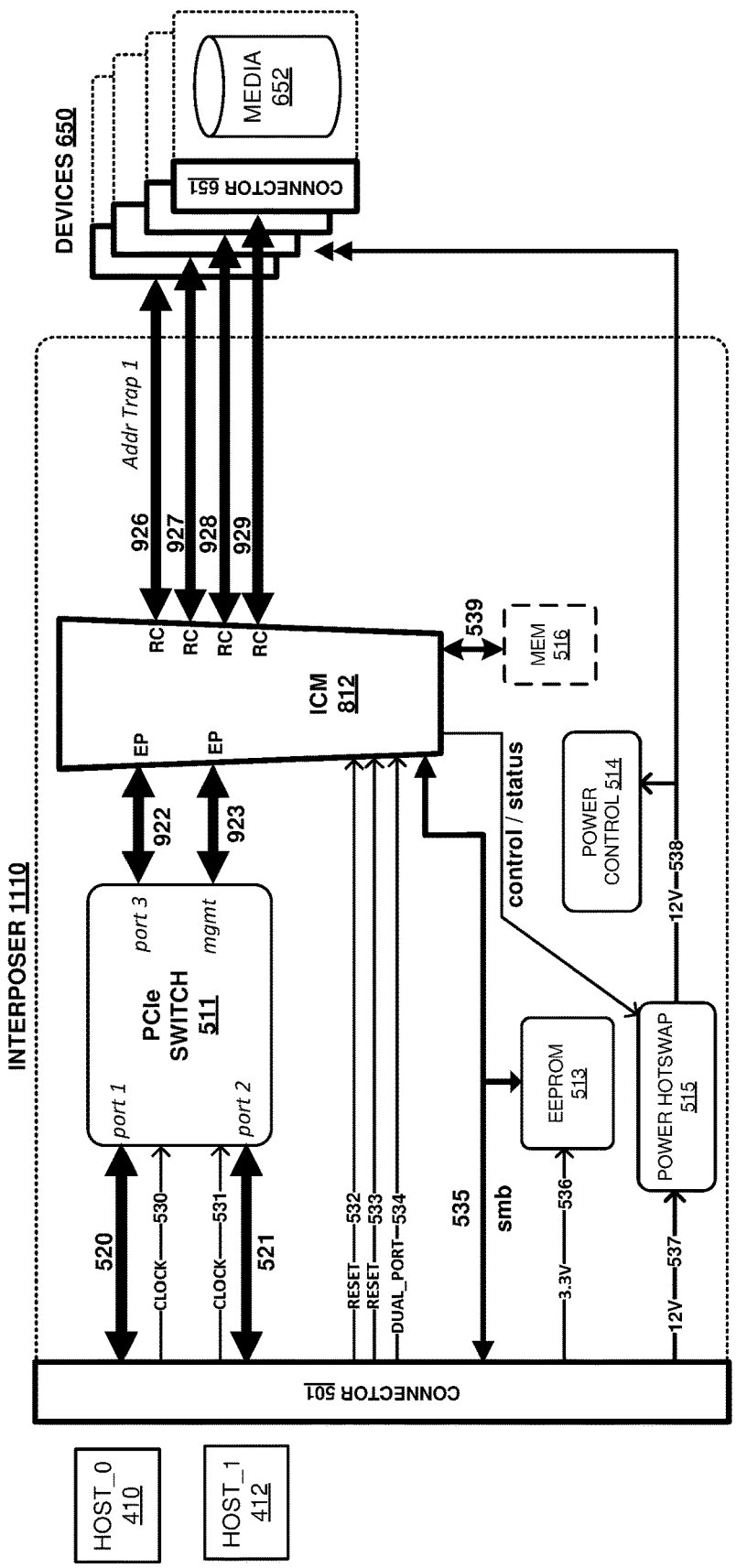
FIG. 11 is a diagram illustrating a storage system in an implementation.

FIG. 11 illustrates system 1100 with similar elements as FIG. 8-10 but with a single front-end PCIe switch 511. ICM 812 in interposer 1110 might include PCIe interface or PCIe switching features to reduce the need for back-end PCIe switch 911 as in FIGS. 9-10. System 1100 places ICM 812 between PCIe switch 511 coupled to a U.2 connector and one or more storage devices over mating connectors, such as devices 650 over PCIe links 926-929. ICM 812 provides endpoint (EP) functionality over links 922-923 and root complex (RC) functionality over links 926-929. This configuration provides a storage interposer which can offer dual port functionality to a plurality of single port M.2 SSDs with a lower part count by eliminating PCIe switch 911 and rolling such functionality into ICM 812.

Figure 12:
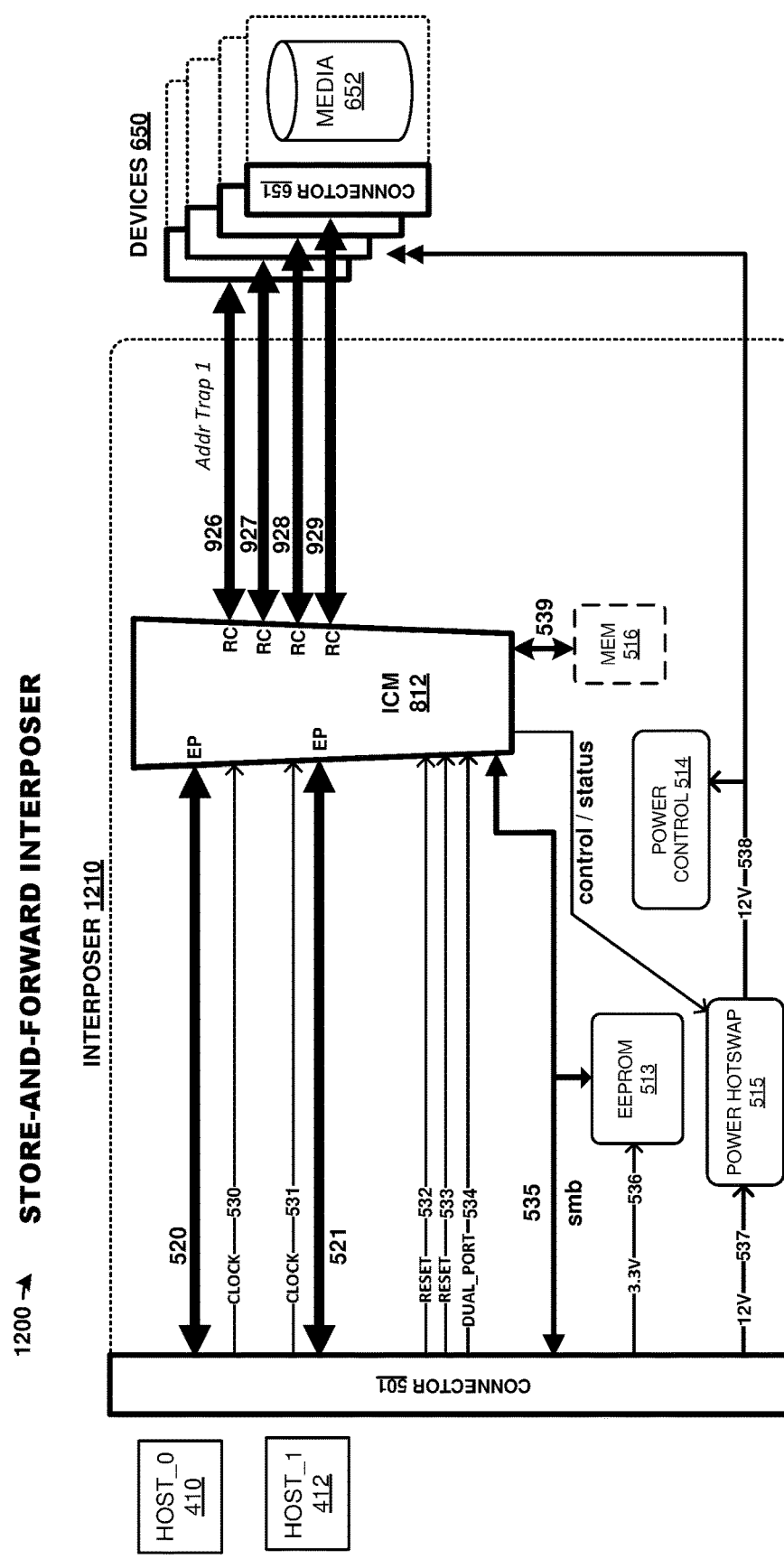
FIG. 12 is a diagram illustrating a storage system in an implementation.

FIG. 12 illustrates system 1200 with similar elements as FIG. 9-11 but with no discrete front-end or back-end PCIe switches 511/911. ICM 812 in interposer 1210 includes PCIe interface and PCIe switching features to reduce the need for both a front-end and a back-end PCIe switch as in FIGS. 9-11. System 1200 places ICM 812 between a U.2 connector and one or more storage devices over mating connectors, such as devices 650 over PCIe links 926-929. ICM 812 provides endpoint (EP) functionality over links 520-521 and root complex (RC) functionality over links 926-929. This configuration provides a storage interposer which can offer dual port functionality to a plurality of single port M.2 SSDs with a lower part count by eliminating PCIe switches 511/911 and rolling such functionality into ICM 812.

In FIGS. 5-12, the associated interposer control module (ICM 512 or 812) can issue instructions for graceful power down of the associated storage devices (550 or 650) to commit in-flight data and ensure proper power down. Holdup circuitry is typically employed, such as by power control 514 or power hot swap 515 which, when in use, signals the ICM to initiate a power down process with the storage drives for in-flight data commit. In FIG. 7, instructions issued over SMBus interfaces 723 can prompt PCIe switch 511 to issue one or more PCIe transactions to storage devices 650 over associated PCIe links 622-625. Specifically, NVMe frames or PCIe transaction layer packets (TLPs) can be injected onto PCIe links that are coupled to storage devices 650 to instruct those storage devices to flush cache elements, power down, or enter low power/standby modes, among other operations. These instructions can prompt storage devices 650 to commit in-flight data or write cached data to non-volatile memory, power down gracefully, or other functions, including combinations thereof. In FIGS. 5, 6, and 8-12, an ICM is coupled to an associated PCIe switch or directly to storage devices over associated PCIe interfaces, and the ICM can issue one or more instructions over the associated PCIe interfaces for handling graceful power down and in-flight data commit. The ICM can 'masquerade' as, or emulate operation of, an associated host system that has previously been communicating with the storage devices so that the storage devices accept the PCIe traffic that originates from the ICM as if the PCIe traffic was issued by the host system.

FIGS. 13-14 include example control module architectures which can be implemented in discrete circuitry, one or more FPGA elements, or one or more software elements in a microcontroller, microprocessor, or CPU, among other elements, including combinations thereof. In some examples, the inline store-and-forward architectures discussed herein for FIGS. 8-12 can be implemented using elements from FIGS. 13-14. However, some elements of FIGS. 13-14 can be employed in the various control elements discussed herein, such as control module 113 of FIG. 1, computing element 200 of FIG. 2, ICM 512 of FIGS. 5-7, and ICM 812 of FIGS. 8-12.

System 1300 in FIG. 13 and system 1400 in FIG. 14 include similar elements, but system 1400 includes additional enhanced data handling features, such as RAID features, data compression, data encryption, data deduplication, or other data features which are incorporated into the FIFO/buffer scheme employed. These data features typically are performed on data payloads contained in or carried by storage operations issued by host systems and directed to storage devices during write operations, or data payloads transferred by storage devices that are directed to the host systems on read operations. Root complex (RC) and endpoint (EP) features are also included in FIGS. 13-14, as found in many of the examples herein.

In FIG. 13, PCIe transactions, such as data storage operations, are received over one or more PCIe links at endpoint (EP) 1310 which can be communicatively coupled to a host or other traffic originator. These storage operations are buffered into dual port buffer device 1321 and then proceed to FIFO structure 1323 before reaching root complex (RC) 1311 that is communicatively coupled via one or more PCIe links to one or more storage devices, such as SSDs. In context with FIGS. 8-12, endpoint 1310 can comprise the host-facing side of ICM 812, while root complex 1311 can comprise the storage device-facing side of ICM 812, although other configurations are possible.

While the storage operations are progressing from endpoint 1310 to root complex 1311, trigger circuitry monitors at least headers of the storage operations, such as headers of PCIe transaction layer packets (TLPs). The trigger circuitry comprises comparator 1352 which compares pre-defined headers or header elements against each current storage operation. Comparator 1352 can employ content-addressable memory (CAM) 1331 to provide fast comparison/searching of current in-flight storage operation headers against a listing of headers to determine if further action should be taken regarding the in-flight storage operations. If any of the in-flight storage operations correspond to a particular header signature then the further action might entail a transferring a response page to the entity which originated the storage operation, such as a particular host or other traffic originator. The header signature can comprise a storage address, a read/write designator, a logical partition designator, a predetermined tag, a transaction type, various PCIe properties, or other header contents, including combinations thereof.

The response page can be partially pre-determined, or pre-composed in the 'command response pages' element 1330, and some elements/portions of the response might be tailored to the particular storage operation at hand, such as a particular storage address, partition identifier, host identifier, tags, and the like. The response page is 'injected' into dual-port buffer 1320 after FIFO 1322 which faces toward the host or traffic originator, allowing for proper acknowledgement or responses to each operation or transaction received from a host, even those that do not ultimately reach a storage device. The in-flight storage operations might be removed from the associated FIFO and prevented from progressing to a particular storage device in some examples. The dual-port buffer allows for a 'normal' data pathway between a host and a storage device, while another control pathway simultaneously checks the in-flight storage operations for particular headers or header patterns.

Thus, the buffer/FIFO structure of FIG. 13 advantageously allows for on-the-fly processing of storage operations without impeding storage operation propagation to an associated storage drive coupled to an interposer module. Moreover, additional functionality can be provided beyond singular host-to-drive storage operations. Multiple hosts can be coupled to multiple shared storage drives, in a 'M:N' configuration of M number of hosts and N number of storage drives. The trigger circuitry can detect storage operations from any host and determine how to selective route the storage operations to particular storage spaces, how to modify associated data before storage on associated storage drives, or to provide inter-host communication pathways/mailboxes.

These inter-host communication pathways can include administration queues used to perform administrative tasks, such as a handshaking operations, mailbox operations, interrupt issuance to hosts, and to prevent overwriting or destruction of existing data when more than one host attempts to access an overlapping storage space. A quasi-network communication can be established between discrete hosts which share a similar storage space. This quasi-network communication can be used to handle semaphore locks for one host to ensure a storage space or data is dedicated to that host and not overwritten or modified by another host. Other administrative tasks include setup of namespaces or partitions for use by the hosts to access the storage spaces of the one or more storage drives.

Control 1350 controls operation of the elements of FIGS. 13 and 14. Control 1350 can comprise microcontroller elements, processor elements, microprocessor elements, discrete logic, among other elements. Control 1350 can interface with position indicator elements 1351 which provide position status of the handling of transactions through the FIFO structures provided in FIGS. 13-14. This position status can be employed for issuing response pages, such as through command response pages element 1330. Also, control of page buffer 1332 can be achieved using this position status.

Moreover, in FIG. 14, additional data functions 1440 can be added into the buffer/FIFO layers to modify or provide enhanced handling of the data associated with storage operations. For example, the storage drives coupled to the interposer might be configured to have data compression provided by the interposer, and an associated control module 1350 that provides data functions 1440 in FIG. 14 might apply one or more on-the-fly compression algorithms to data associated with write operations as the storage operations progress downward through FIFO structure 1323 to the storage devices, and the compressed data is then transferred for storage on the associated storage devices. On read operations, a similar process can occur in FIFO structure 1322 for on-the-fly data decompression by data functions 1440. Thus, the storage drives need not be aware of the storage enhancements, such as data compression, performed by the interposer module. Similar operations can be employed for data encryption/decryption, data deduplication, RAID/striping/redundancy features, or other data features. Advantageously, the storage interposer which employs these features can add additional functionality to a storage drive beyond the feature set originally incorporated into the storage drive, such as data redundancy, compression, encryption, error correction, and dual-port or multi-host functionality.

Namespace abstraction can also be achieved using data functions 1440 and the elements discussed herein. In these examples, a storage space can be defined across any number of storage devices to form one or more logical storage spaces or partitions which span the storage devices. A host and storage device need not be aware of the physical arrangement of the storage devices as the storage interposer can define and handle the routing and arrangement of the storage spaces among various physical storage devices.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A storage interposer module, comprising:
   a host connector configured to couple to one or more host systems over associated host Peripheral Component Interconnect Express (PCIe) interfaces;
   PCIe switch circuitry configured to receive storage operations over the host connector that are issued by the one or more host systems and transfer the storage operations for storage by one or more storage devices over drive PCIe interfaces;
   the PCIe switch circuitry configured to provide an address trap for the storage operations based at least on an address range associated with the storage operations, wherein when ones of the storage operations correspond to the address trap, the PCIe switch circuitry indicates ones of the storage operations to the interposer control module over a control interface;
   an interposer control module configured to monitor the storage operations in the PCIe switch circuitry via the control interface coupled between the PCIe switch circuitry and the interposer control module, and selectively direct delivery of each of the storage operations to corresponding storage areas among the one or more storage devices based at least on information monitored about the storage operations in the PCIe switch circuitry; and
   the interposer control module configured to provide host-to-host communication based at least in part on the ones of the storage operations directed to the interposer control module using the address trap.

2. The storage interposer module of claim 1, wherein the information monitored about the storage operations in the PCIe switch circuitry comprises addressing information associated with the storage operation.

3. The storage interposer module of claim 1, wherein the host-to-host communication comprises resource locking communications for storage resource exclusivity among the one or more storage devices.

4. The storage interposer module of claim 1, wherein the interposer control module is communicatively coupled to the one or more hosts via the PCIe switch circuitry and coupled to the drive PCIe interfaces, and wherein the PCIe switch circuitry directs the storage operations to the one or more storage devices through the interposer control module.

5. The storage interposer module of claim 1, wherein the interposer control module is communicatively coupled to the one or more hosts via the PCIe switch circuitry and further PCIe switch circuitry that communicatively couples the drive PCIe interfaces to the interposer control module, and wherein the PCIe switch circuitry directs the storage operations to the one or more storage devices through the interposer control module.

6. The storage interposer module of claim 1, wherein the interposer control module comprises the PCIe switch circuitry, wherein the interposer control module is communicatively coupled to the one or more hosts via the PCIe switch circuitry and coupled to the drive PCIe interfaces via further PCIe switch circuitry separate from the interposer control module, and wherein the interposer control module directs the storage operations to the one or more storage drives through the further PCIe switch circuitry.

7. The storage interposer module of claim 1, wherein the interposer control module comprises the PCIe switch circuitry, wherein the interposer control module is communicatively coupled to the one or more hosts via the PCIe switch circuitry, wherein the interposer control module comprises further PCIe switch circuitry that couples the interposer control module to the drive PCIe interfaces, and wherein the interposer control module directs the storage operations to the one or more storage drives through the further PCIe switch circuitry.

8. The storage interposer module of claim 1, wherein the storage operations are configured to pass through the interposer control module before reaching the one or more storage drives; and comprising:
the interposer control module further configured to apply one or more data functions to data included in the storage operations after receipt from the one or more host systems and prior to transfer of the storage operations to the one or more storage drives.

9. A method of operating a storage interposer module, the method comprising:
receiving storage operations over a shared host connector that are issued by two host systems over associated Peripheral Component Interconnect Express (PCIe) interfaces and directed to one or more storage devices;
in the PCIe switch circuitry, providing an address trap for the storage operations based at least on an address range associated with the storage operations, and responsive to ones of the storage operations corresponding to the address trap, directing ones of the storage operations to a control module; and
in the control module, providing host-to-host communication based at least in part on the ones of the storage operations directed to the control module, wherein the host-to-host communication comprises resource locking communications for storage resource exclusivity among a shared storage space shared among the two host systems and provided by the one or more storage devices.

10. The method of claim 9, further comprising:
responsive to a first host system establishing a resource lock on the shared storage space, directing storage operations issued by the first host system to the shared storage space and blocking storage operations issued by a second host system from the shared storage space.

11. The method of claim 9, further comprising:
responsive to the first host system releasing the resource lock on the shared storage space or the second host system establishing the resource lock on the shared storage space, directing storage operations issued by the second host system to the shared storage space and blocking storage operations issued by the first host system from the shared storage space.

12. The method of claim 10, further comprising:
before directing the storage operations issued by the first host system to the shared storage space, applying one or more data functions to storage data included in the storage operations issued by the first host system.

13. The method of claim 9, further comprising:
responsive to detecting a power loss that affects the one or more storage devices, emulating one or more of the host systems to inject control traffic onto interfaces of the one or more storage devices to control a data commit process of the one or more storage devices.

14. A storage system, comprising:
one or more connectors for communication with at least two host systems;
one or more storage devices each comprising a Peripheral Component Interconnect Express (PCIe) interface and solid state storage media, and configured to store and retrieve data responsive to storage operations received over an associated PCIe interface;
PCIe switch circuitry configured to receive the storage operations over the one or more connectors that are issued by the at least two host systems and transfer the storage operations for storage by the one or more storage devices;
a control module configured to monitor the storage operations in the PCIe switch circuitry and selectively control delivery of first ones of the storage operations associated with a first host system to a first storage area of the one or more storage devices and second ones of the storage operations associated with a second host system to a second storage area of the one or more storage devices; and
the control module configured to monitor the storage operations received by the PCIe switch circuitry to identify third ones of the storage operations transferred by the at least two host systems for communication between the at least two host systems, and responsively direct the third ones of the storage operations to a third storage area of the one or more storage devices configured as a communication space for the at least two host systems.

15. The storage system of claim 14, comprising:
responsive to detecting a power loss of the storage system, the control module configured to inject PCIe control traffic into the PCIe switch circuitry for transfer over the associated PCIe interfaces of the storage devices to control a data commit process of the one or more storage devices.

16. The storage system of claim 14, wherein the one or more connectors for communication with at least two host systems comprises a dual-port U.2 connector shared among the at least two host systems, and wherein the one or more storage devices each couple as a single-port PCIe device over the associated PCIe interface via M.2 connectors.

17. The storage system of claim 14, wherein the one or more connectors for communication with at least two host systems comprises a dual-port U.2 connector shared among the at least two host systems, and wherein a first storage device couples as a single-port PCIe device over an associated PCIe interface via a U.2 connector.

* * * * *

UNITED STATES PATENT AND TRADEMARK OFFICE
CERTIFICATE OF CORRECTION

PATENT NO. : 10,402,363 B2
APPLICATION NO. : 15/618668
DATED : September 3, 2019
INVENTOR(S) : Christopher R. Long et al.

It is certified that error appears in the above-identified patent and that said Letters Patent is hereby corrected as shown below:

In the Specification

Column 4, Line 56, delete "SH-8639" and insert --SFF-8639--

Column 16, Line 23, insert the following paragraph --Figure 8 illustrates system 800 which provides a store-and-forward architecture with interposer 810 employing ICM 812 in-line with a data pathway. ICM 812 can be an example implementation of control module 113 in Figure 1, or computing element 200 of Figure 2, although variations are possible. System 800 places the ICM 812 between a PCIe switch coupled to a U.2 connector and one or more storage devices, such as device 550 over a mating connector. This configuration provides a storage interposer which can offer dual port functionality to one or more single port SSDs. Moreover, the store and forward architecture can eliminate a need for host-side drivers or software which elements in Figures 5-7 might employ to provide the dual port features. In some examples, PCIe links 822-823 each comprise Gen2 or Gen3 PCIe x4 links. ICM 812 provides PCIe endpoint (EP) functionality for link 822 and PCIe root complex (RC) functionality for link 823 and device 550.--

Signed and Sealed this
Fifteenth Day of September, 2020

Andrei Iancu
*Director of the United States Patent and Trademark Office*